United States Patent
Sterman et al.

(10) Patent No.: US 10,225,402 B2
(45) Date of Patent: Mar. 5, 2019

(54) VIRTUAL IDENTIFIER FOR EMERGENCY CALL HANDLING

(71) Applicant: VONAGE BUSINESS INC., Atlanta, GA (US)

(72) Inventors: Baruch Sterman, Efrat (IL); Stephen Hudek, Manalapan, NJ (US); Bryan Stokes, Hillsborough, NJ (US)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 15/352,832

(22) Filed: Nov. 16, 2016

(65) Prior Publication Data

US 2017/0187879 A1     Jun. 29, 2017

Related U.S. Application Data

(63) Continuation of application No. 14/686,960, filed on Apr. 15, 2015.

(51) Int. Cl.
    *H04M 3/51*            (2006.01)
    *H04L 29/06*          (2006.01)
    (Continued)

(52) U.S. Cl.
    CPC ....... *H04M 3/5116* (2013.01); *H04L 65/1006* (2013.01); *H04M 3/42059* (2013.01);
    (Continued)

(58) Field of Classification Search
    USPC ...................................... 455/403; 379/37–52
    See application file for complete search history.

(56) References Cited

U.S. PATENT DOCUMENTS 6,975,941 B1    12/2005   Lau et al.
2002/0111173 A1    8/2002   Hendrey et al.
(Continued)

OTHER PUBLICATIONS

FCC Consumer Guide, "911 Wireless Services", Federal Communications Commission, Consumer and Governmental Affairs Bureau, http://www.fcc.gov/guides/wireless-911-services.
(Continued)

*Primary Examiner* — Maria El-Zoobi
(74) *Attorney, Agent, or Firm* — FisherBroyles, LLP; Joseph Pagnotta

(57) ABSTRACT

In one of its aspects the technology disclosed herein concerns an Internet Protocol (IP) telephony communication system (20) comprising a location server (150(13)) and a call server (52). The location server (150(13)) is configured to obtain a first virtual identifier associated with a first telephony visit associated with a customer account to a first physical location and to obtain a second virtual identifier associated with a second telephony visit associated with the customer account to a second physical location. The location server (150(13)) is configured to obtain the first virtual identifier and the second virtual identifier in coordination with an emergency answering service (58). The call server (52) is configured to provide the emergency answering service (58) with an appropriate one of the first virtual identifier and the second virtual identifier in accordance with whichever of the first physical location and the second location is an emergency location from which an emergency call associated with the customer account is placed.

24 Claims, 26 Drawing Sheets

(51) Int. Cl.
    *H04M 3/42*    (2006.01)
    *H04M 7/00*    (2006.01)
(52) U.S. Cl.
    CPC ..... *H04M 3/42357* (2013.01); *H04M 7/0075* (2013.01); *H04M 3/42348* (2013.01); *H04M 2242/04* (2013.01)

(56) References Cited

U.S. PATENT DOCUMENTS

| | | |
|---|---|---|
| 2006/0293024 A1 | 12/2006 | Benco et al. |
| 2007/0121598 A1 | 5/2007 | McGary |
| 2007/0127452 A1* | 6/2007 | Croy ............... H04L 41/12 370/356 |
| 2008/0200143 A1 | 8/2008 | Qiu et al. |
| 2009/0097474 A1 | 4/2009 | Ray et al. |
| 2009/0215427 A1 | 8/2009 | Hawkins |
| 2011/0026687 A1* | 2/2011 | Smelyansky ....... H04L 12/66 379/45 |
| 2012/0101818 A1 | 4/2012 | Scott et al. |
| 2014/0004881 A1 | 1/2014 | Alles et al. |
| 2014/0018032 A1 | 1/2014 | Ray et al. |
| 2014/0036658 A1 | 2/2014 | Bonner et al. |
| 2014/0169230 A1 | 6/2014 | Arora |

OTHER PUBLICATIONS

U.S. Appl. No. 14/217,985, filed Mar. 18, 2014, entitled "Location-Aware Emergency Address Handling Methods and Systems".
Office Action dated Oct. 3, 2014 in U.S. Appl. No. 14/217,985.
U.S. Appl. No. 14/446,544, filed Jul. 30, 2014, entitled "Location-Aware Emergency Address Handling Methods and Systems".
Office Action dated Oct. 3, 2015 in U.S. Appl. No. 14/446,544.
Office Action dated Nov. 24, 2015 in U.S. Appl. No. 14/686,960.
Final Office Action dated May 16, 2016 in U.S. Appl. No. 14/686,960.

* cited by examiner

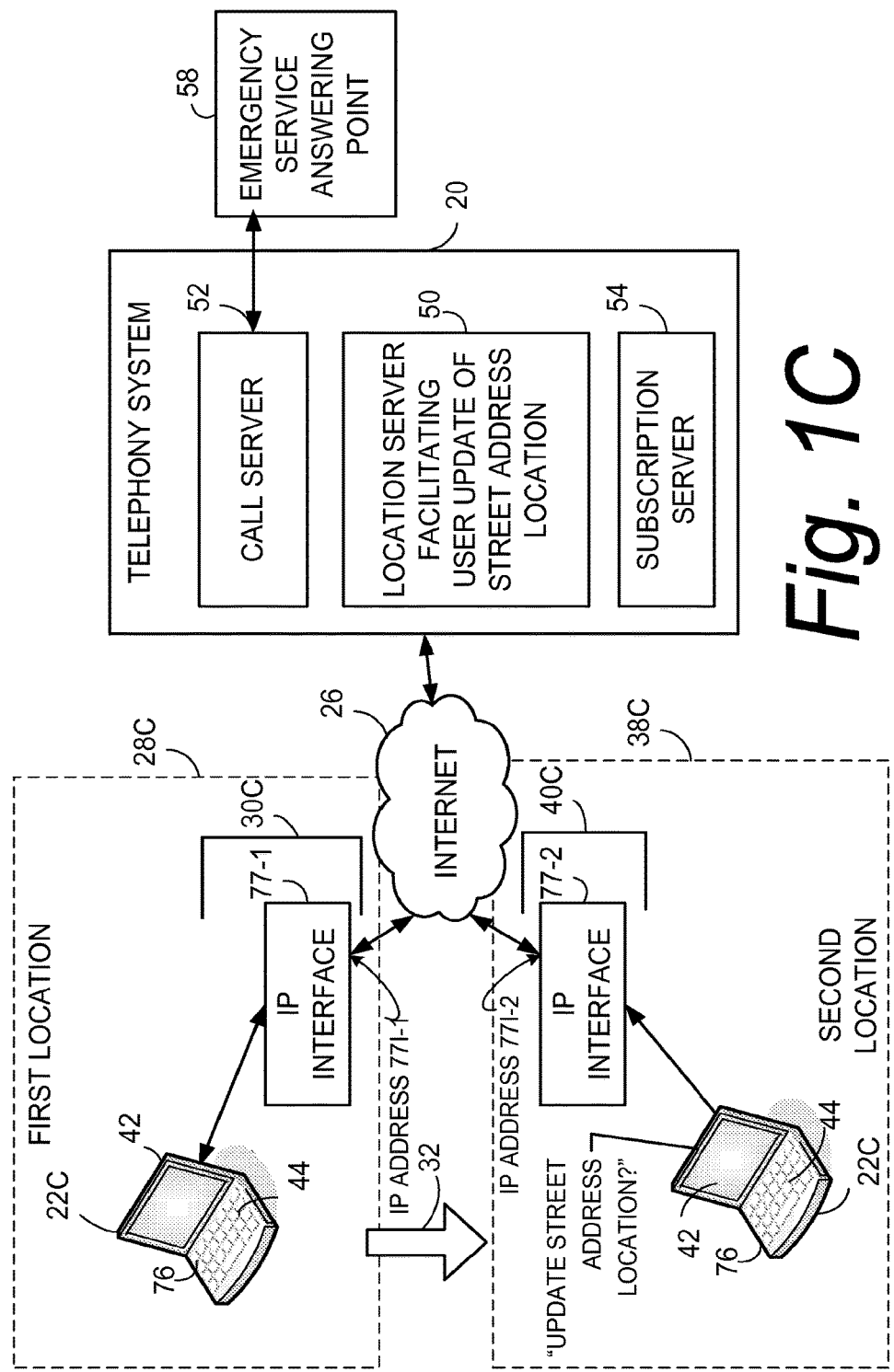

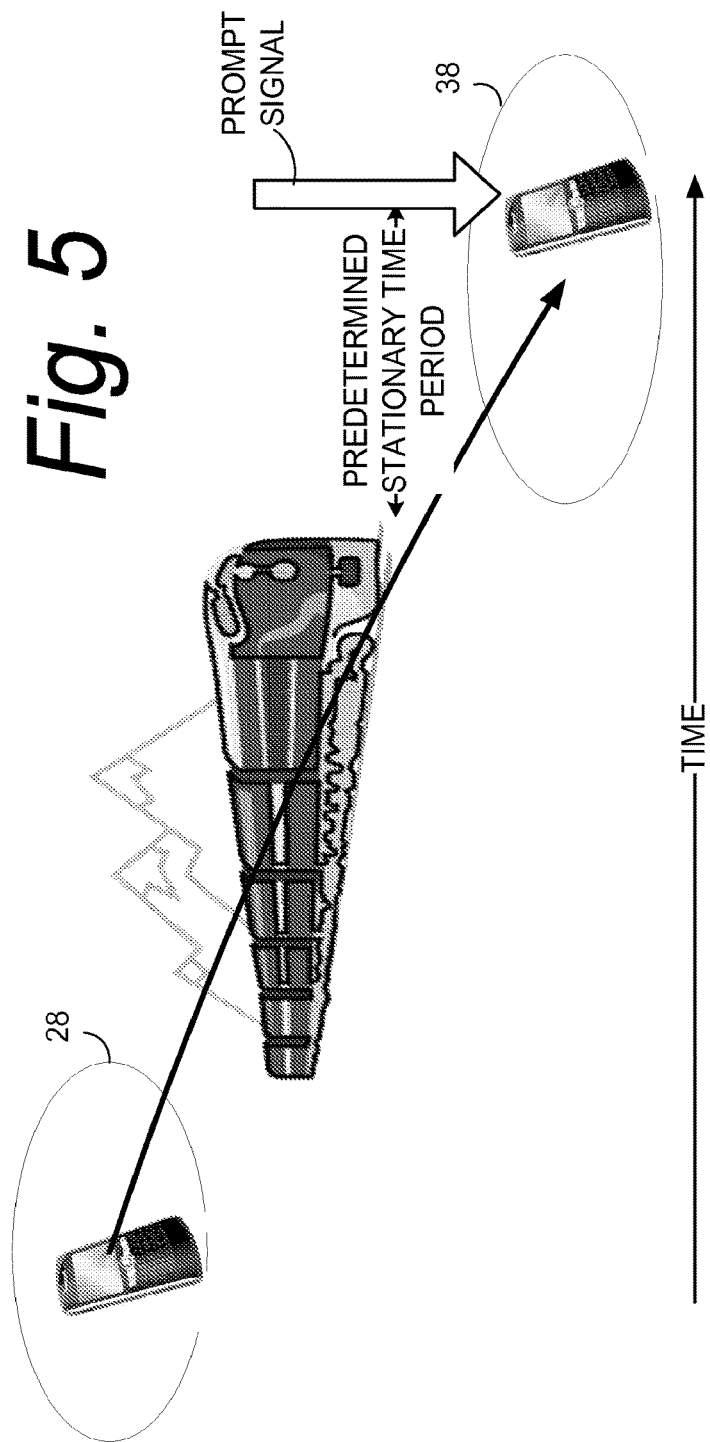

VIRTUAL IDENTIFIER FOR EMERGENCY CALL HANDLING

This application is a continuation of U.S. patent application Ser. No. 14/686,960 filed Apr. 15, 2015, entitled "Virtual Identifier For Emergency Call Handling", the entire contents of which is incorporated herein by reference.

TECHNICAL FIELD

The technology relates to telecommunications, and particular the storage and provision of telephony device location information by a telephony service for use in reporting an emergency access call.

BACKGROUND

Many countries recognize that the ability to access emergency services by telephone is a vital component of public safety and emergency preparedness. For example, in the United States of America the Federal Communications Commission (FCC) requires that consumers of telephone service be able to reach emergency services regardless of the technology used to place a 9-1-1 call. More specifically, the FCC requires that providers of "interconnected" Voice over Internet Protocol (VoIP) services meet Enhanced 9-1-1 (E9-1-1) obligations. E9-1-1 systems automatically provide to emergency service personnel a 9-1-1 caller's call back number and, in most cases, location information. See, e.g., http://www.fcc.gov/guides/voip-and-9-1-1-service.

Thus, for VoIP services the FCC mandates that a VoIP provider provide a location for the VoIP customer. Responses to emergency access calls, e.g., 9-1-1 calls, placed using the VoIP service are routed based on the location provided by the VoIP service. Generally, the location provided by the VoIP service is an address that was previously provided to the VoIP service by the VoIP customer. In the case of stationary VoIP equipment (such as a standard analog telephone-VoIP adapter home setup), the VoIP user, when making the 9-1-1 call, may often reasonably be assumed actually to be at the location provided to the VoIP service. However, this is not always the case, as VoIP customers may readily connect their devices, such as IP phones, to any suitable broadband connection, thereby moving their actual physical location without necessarily updating the address previously provided to the VoIP service. Moreover, many people use VoIP telephone services on mobile or wireless devices, e.g., mobile phones that are tied to a cell carrier. In these cases, the 9-1-1 call on the VoIP service may be directed to the native dialer for termination on the native cell network. VoIP services may even be offered for wireless devices that do not have any association with a separate cell network. In these cases, there is no "native" dialer over which the 9-1-1 call can be directed.

Many if not most cell phones are now equipped with Global Positioning System (GPS) functionality, and as such are able to supply via a telephone service the GPS coordinates of the cell phone when making an emergency access call. While FCC and other regulations impose requirements regarding accuracy of the GPS coordinates that must be provided, the GPS coordinates may not be entirely unambiguous or definitively precise in some topological environments. For example, in a dense urban environment several dwelling units or business offices/establishments may be within the ambit of the GPS coordinates. Consider, for example, the situation of a multi-story apartment or office building in which the GPS coordinates may not provide sufficient differentiation between floors of the building, or sufficient specificity with respect to adjacent or proximate units (e.g., hotel rooms) on a same floor.

What is desired therefore, and an exemplary advantage of the technology disclosed herein, are methods, systems, and techniques that more accurately reflect where a user is located so that responses to emergency access calls may be correctly and precisely directed.

SUMMARY

In one of its aspects the technology disclosed herein concerns an Internet Protocol (IP) telephony communication system comprising a location server and a call server. The location server is configured to obtain a first virtual identifier associated with a first telephony visit associated with a customer account to a first physical location and to obtain a second virtual identifier associated with a second telephony visit associated with the customer account to a second physical location. The location server is configured to obtain the first virtual identifier and the second virtual identifier in coordination with an emergency answering service. The call server is configured to provide the emergency answering service with an appropriate one of the first virtual identifier and the second virtual identifier in accordance with whichever of the first physical location and the second location is an emergency location from which an emergency call associated with the customer account is placed.

In an example embodiment and mode the first telephony visit and the second telephony visit involve a same telephony device associated with the customer account.

In an example embodiment and mode the first telephony visit and the second telephony visit involve different telephony devices associated with the customer account.

In an example embodiment and mode the location server is further configured to obtain the physical location in a message received from a telephony device associated with the customer account when the telephony device accesses a data network through which the telephony device communicates with the telephony system.

In an example embodiment and mode the location server is further configured to obtain the physical location information from a tag of a "From:" header of a Session Initiation Protocol (SIP) message received when a telephony device associated with the customer account accesses a data network through which the telephony device communicates with the telephony system.

In an example embodiment and mode the virtual identifier comprises a virtual calling party number which is coordinated with the emergency answering service to be associated with the physical location.

In an example embodiment and mode the telephony communications system further comprises a virtual identifier database configured to store the virtual identifier in association with the physical location.

In an example embodiment and mode, when a telephony device registers a physical location with the telephony system, the location server is configured to store a unique virtual identifier, the unique virtual identifier being unique to a combination of customer identifier and the physical location being registered.

In an example embodiment and mode, when a telephony device associated with the customer number registers a physical location with the telephony system the location server is configured to store a virtual identifier that has already been associated with the physical location being registered, whereby the physical location for the physical location being registered is accessed by a combination of the virtual identifier and customer identifier.

In an example embodiment and mode the location server is further configured: (1) to receive an indication of a change of physical location of a telephony device associated with the customer account; (2) upon receipt of the indication of change of physical location of the telephony device, to generate a prompt signal configured to invite the user of the telephony device to provide physical location information for a current physical location of the telephony device; (3) to obtain the physical location information for the current physical location; and (4) to store the physical location information in association with the respective virtual identifier.

In an example embodiment and mode the location server is configured to detect one or more of the following: a change of network address utilized by the telephony device; a change of network provider utilized by the telephony device; a change of GPS coordinates of the telephony device; a change of indoor location information such as a Bluetooth beacon; and a change of wireless access connection of the telephony device.

In another of its aspects the technology disclosed herein concerns method of operating an Internet Protocol (IP) telephony communication system. In a basic mode the method comprises obtaining in coordination with an emergency answering service a first virtual identifier associated with a first telephony visit associated with a customer account to a first physical location; obtaining in coordination with an emergency answering service a second virtual identifier associated with a second telephony visit associated with the customer account to a second physical location; and providing the emergency answering service with an appropriate one of the first virtual identifier and the second virtual identifier in accordance with whichever of the first physical location and the second location is an emergency location from which an emergency call associated with the customer account is placed.

In an example embodiment and mode the first telephony visit and the second telephony visit involve a same telephony device associated with the customer account.

In an example embodiment and mode the first telephony visit and the second telephony visit involve different telephony devices associated with the customer account.

In an example embodiment and mode the method further comprises obtaining the physical location in a message received from a telephony device associated with the customer account when the telephony device accesses a data network through which the telephony device communicates with the telephony system.

In an example embodiment and mode the method further comprises obtaining the physical location information from a tag of a "From:" header of a Session Initiation Protocol (SIP) message received when a telephony device associated with the customer account accesses a data network through which the telephony device communicates with the telephony system.

In an example embodiment and mode the virtual identifier comprises a virtual calling party number which is coordinated with the emergency answering service to be associated with the physical location.

In an example embodiment and mode the method further comprises storing the virtual identifier in association with the physical location in a virtual identifier database.

In an example embodiment and mode the method further comprises a telephony device registering a physical location with the telephony system; and storing a unique virtual identifier in a virtual identifier database, the unique virtual identifier being unique to a combination of customer identifier and the physical location being registered.

In an example embodiment and mode the method further comprises a telephony device associated with the customer number registering a physical location with the telephony system; storing in a virtual identifier database a virtual identifier that has already been associated with the physical location being registered, whereby the physical location for the physical location being registered is accessed by a combination of the virtual identifier and customer identifier.

In an example embodiment and mode the location server is further configured: (1) to receive an indication of a change of physical location of a telephony device associated with the customer account; (2) upon receipt of the indication of change of physical location of the telephony device, to generate a prompt signal configured to invite the user of the telephony device to provide physical location information for a current physical location of the telephony device; (3) to obtain the physical location information for the current physical location; and (4) to store the physical location information in association with the respective virtual identifier.

In an example embodiment and mode the location server is configured to detect one or more of the following: a change of network address utilized by the telephony device; a change of network provider utilized by the telephony device; a change of GPS coordinates of the telephony device; a change of indoor location information such as a Bluetooth beacon; and a change of wireless access connection of the telephony device.

In another of its aspects the technology disclosed herein concerns a telephony device comprising a radio communication interface and a processor. The radio communication interface is configured for radio frequency communications between the telephony device and an Internet Protocol (IP) telephony system. The processor is configured to include physical location information of a physical location at which the telephony device is located in a message configured to initiate a session with the Internet Protocol telephony system.

In an example embodiment and mode the processor is configured to use information of one or more of a number of visits to a candidate physical location within a specified time window, visit duration within the specified time window, and cumulative time spent at the candidate physical location within the specified time window to make a determination that the candidate physical location is to be registered as a physical location for emergency reporting purposes.

In an example embodiment and mode the processor is configured to use a pattern of detected networks to determine a candidate physical location physical and to make a determination that the candidate physical location should be registered as a physical location for emergency reporting purposes.

In another of its aspects the technology disclosed herein concerns a software program product comprising instructions stored on a non-transitory media which, when executed by a processor of a telephony device perform an act of including physical location information of a physical location at which the telephony device is located in a message configured to initiate a session with the Internet Protocol telephony system.

In an example embodiment and mode the software program product further comprises instructions stored on the non-transitory media which, when executed by the processor, use information of one or more of a number of visits to a candidate physical location within a specified time window, visit duration within the specified time window, and cumulative time spent at the candidate physical location within the specified time window to make a determination that the candidate physical location is to be registered as a physical location for emergency reporting purposes.

In an example embodiment and mode the software program product further comprises instructions stored on the non-transitory media which, when executed by the processor, use a pattern of detected networks to determine a candidate physical location physical and to make a determination that the candidate physical location should be registered as a physical location for emergency reporting purposes.

In another of its aspects the technology disclosed herein concerns a method in a telephony device. The method comprises including physical location information of a physical location at which the telephony device is located in a message configured to initiate a session with the Internet Protocol telephony system; and, sending the message to the Internet Protocol telephony system.

In an example embodiment and mode the method further comprises using information of one or more of: a number of visits to a candidate physical location within a specified time window, visit duration within the specified time window, and cumulative time spent at the candidate physical location within the specified time window to make a determination that the candidate physical location is to be registered as a physical location for emergency reporting purposes.

In an example embodiment and mode the method further comprises using a pattern of detected networks to determine a candidate physical location physical and to make a determination that the candidate physical location should be registered as a physical location for emergency reporting purposes.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1C is a diagrammatic view of an exemplary scenario wherein the radio communications system of FIG. 1 serves a "soft" telephony device.

FIG. 5 is a diagrammatic view depicting generation of a prompt after elapse of a predetermined stationary time period.

DETAILED DESCRIPTION

Figure 1:
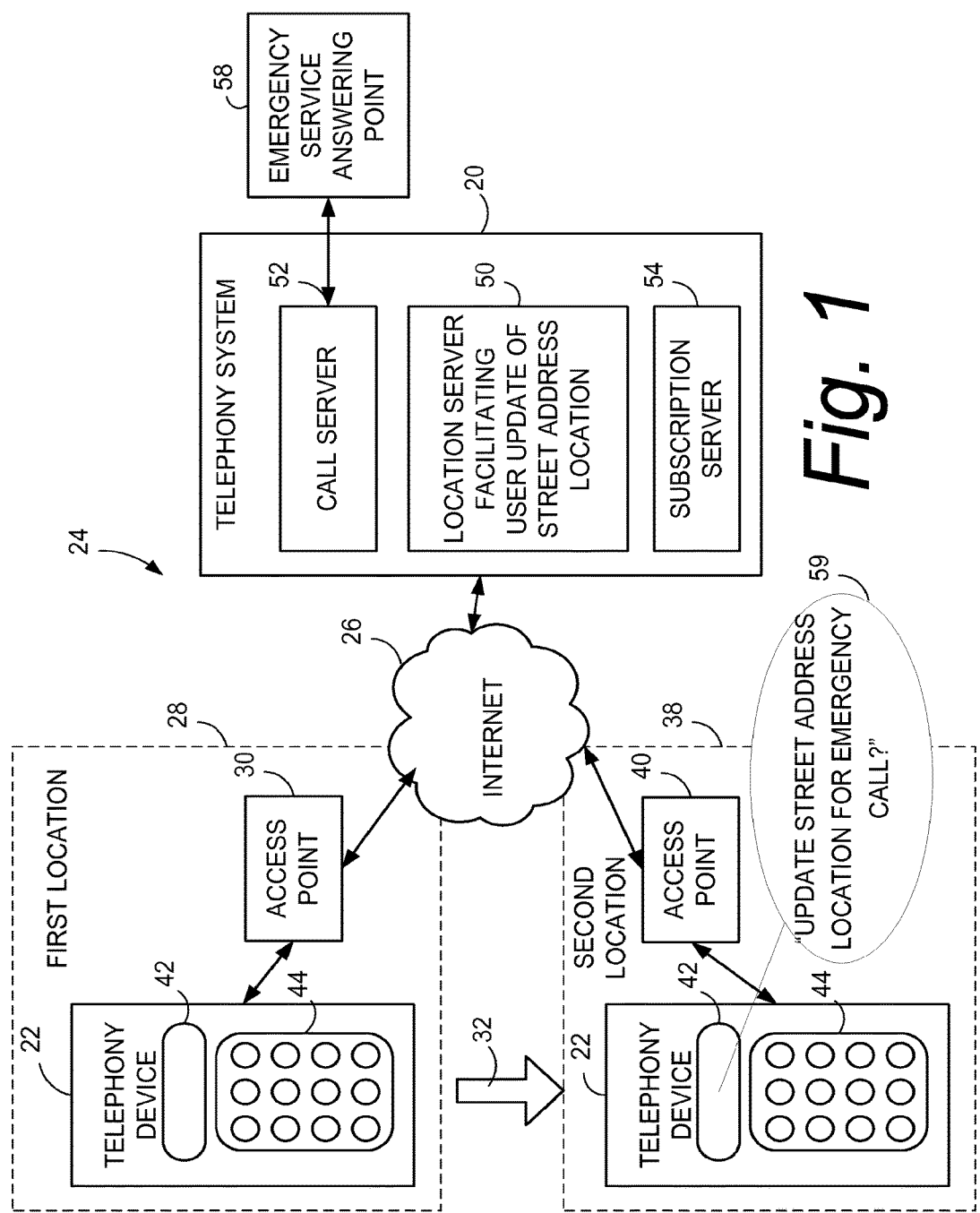
FIG. 1 is a diagrammatic view of an example generic embodiment of a radio communications system comprising a telephony service which facilitates user update of street address location for use when accessing emergency services.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In the following description, the terms VOIP system, VOIP telephony system, IP system and IP telephony system are all intended to refer to a system that connects callers and that delivers data, text and video communications using Internet protocol data communications.

The following description will refer to telephony communications. The term telephony communications is intended to encompass any type of communication that could pass back and forth between users of an IP telephony system. This includes audio and video telephone, text messages, video messages and any other form of telephony or data communication.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include a laptop computer, the Apple iPod Touch™ and the iPad™. Such a device may act as a mobile telephony device once it is configured with appropriate application software.

The technology disclosed herein concerns, e.g., a telephony system 20 which facilitates user update of street address location, so that the updated street address location may be utilized when accessing emergency services when an emergency call (e.g., a 9-1-1 call) is made using a telephony device 22. As used herein, "street address" and "street address location" encompasses, but is not necessarily limited to, a description that specifies both a name of a street (or other access channel) and a building number or other building identifier that enables ready location of a house, office, or building unit. In an exemplary implementation, "street address" and "street address location" include at least address information which is commensurate with a document known as the Master Street Addressing Guide (MSAG), and is intended to include such information as specified by the MSAG at the applicable time of the call. By way of non-limiting example, a street address location may include street address; street name; floor, suite, apartment or office number (if applicable); city; state; country, and zip code, or the like.

FIG. 1 shows a telephony system 20, in context of an exemplary generic communications system 24, which facilitates user update of street address location. In view of the fact that the telephony system 20 may be an Internet (IP) telephony service, the telephony system 20 is shown as connected to a data communications network such as Internet 26. The telephony device 22 is first shown in FIG. 1 as being situated at first location (framed by dotted line 28) where it is connected through first access point 30 to Internet 26. However, as reflected by displacement arrow 32, the telephony device 22 may be physically moved to a second location 38 (framed by dotted line 38) where it is connected through second access point 40 to Internet 26.

As explained herein, telephony device 22 may be any one of many different technology types and models. For purposes of initial general discussion the telephony device 22 of FIG. 1 is shown as comprising output interface 42 and input interface 44. The output interface 42 may accommodate audio and/or visual output. The output interface 42 may comprise a screen, such as an LCD or LED screen or other display device upon which information can be provided to the user, either in textual or graphical form. The input interface 44 may be a keypad, with either physical actuated push-button keys, or a touch sensitive display (e.g., LCD, LED, etc.) which is driven to provide an image or representation of input keys of a keypad. When input interface 44 comprises a display screen or the like, a same screen may function both as output interface 42 and input interface 44.

The telephony system 20 of FIG. 1 is shown as comprising location server 50, call server 52, and subscription server 54, each of which are described herein. The telephony system 20, and call server 52 in particular, is connected to emergency service answering point 58. The emergency service answering point 58 is typically a public office which handles emergency calls, such as 9-1-1 calls.

The technology disclosed herein facilitates user update of street address location upon receiving an indication of a change of physical location of telephony device 22. In so doing, as explained herein, a prompt or query or invitation is provided to a user of a telephony device 22. The query or invitation basically prompts the user to change a street address location which is to be reported when making an emergency call. The query or invitation may be presented to the user using output interface 42 of telephony device 22. Alternatively, the query or invitation may be presented to the user via computer or telecommunications device, e.g., a computer (laptop or desktop) or a mobile phone which is other than the telephony device 22. For the case in which the query or invitation is presented on the telephony device 22, such query or invitation is illustrated in FIG. 1 by the text box 59 "Update Street address location?" The query or invitation may be visual, e.g., displayed on a screen of output interface, or an audio output generated to be heard by the user.

The location server 50, call server 52, and subscription server 54 represent basic functional entities of telephony system 20 which are pertinent to the technology disclosed herein. It will be appreciated that telephony system 20 typically comprises other functional entities as well. The location server 50, call server 52, and subscription server 54 may be provided on or realized by machine hardware (framed by broken line 56 in FIG. 2). Examples of physical components of typical machine hardware 56 are described with respect to FIG. 8. While these functional units have each been labeled as "servers," they need not necessarily be three distinct physical devices. Rather, these functional entities may be shared or distributed over one or more physical devices such as servers, processors, or controllers.

Figure 2:
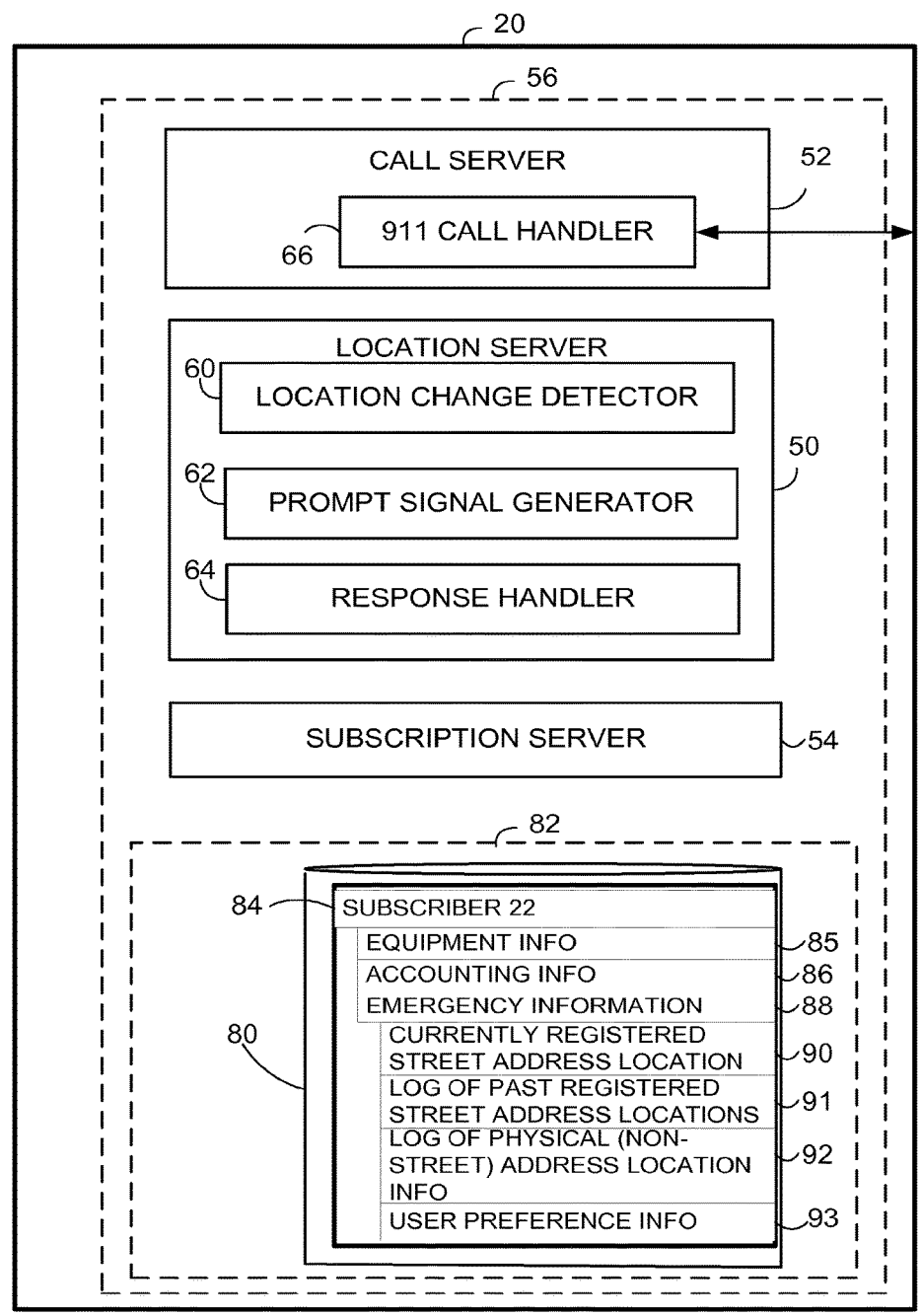
FIG. 2 is a schematic view of a telephony system which facilitates user update of street address location for use when accessing emergency services.

FIG. 2 shows more details of the telephony system 20, and particularly of location server 50, call server 52, and subscription server 54. While call server 52 is understood to be configured to handle many different types of calls involving subscribing users of telephony system 20, for the sake of simply describing functions germane to the technology disclosed herein FIG. 2 only shows call server 52 as comprising emergency call handler (e.g., 9-1-1 call handler) 66. The emergency call handler 66 is connected to emergency service answering point 58. In some exemplary implementations the emergency call handler 66 may be connected to emergency service answering point 58 through VoIP Positioning Centers (VPCs), e.g., emergency communications infrastructure such as that provided by Intrado Inc. or TeleCommunication Systems (TCS).

Figure 3:
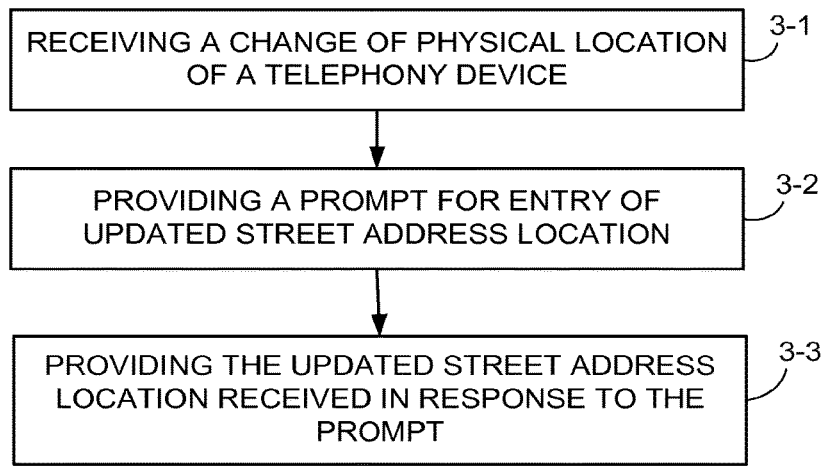
FIG. 3 is a flowchart showing basic exemplary acts or steps comprising a method of updating street address location upon change of physical location of a telephony device.

FIG. 3 shows a basic method of updating an emergency street address location according to a generic exemplary embodiment and mode. Act 3-1 comprises receiving an indication of change of physical location of a telephony device (e.g., telephony device 22) subscribed to the telephony communication system. Act 3-2 comprises providing a prompt configured to request an updated street address location. In some embodiments, a "prompt" encompasses an output which presents to the user a query or invitation for the user to enter a current street address location. In some instances the prompt is triggered by a prompt signal generated by the location server 50. Act 3-3 comprises storing the updated street address location received in response to the prompt. It should be appreciated that act 3-1 through and including act 3-3 may be performed either at telephony service 20 or by telephony device 22. Then, when an emergency call is placed by the telephony device, the telephony service 20 obtains access to the updated street address location and provides the updated street address location to the emergency service answering point 58

In an exemplary embodiment location server 50 is shown in FIG. 2 to comprise location change detector 60, prompt signal generator 62, and response handler 64. In an embodiment in which telephony service 20 performs the acts of FIG. 3, the location change detector 60 may perform act 3-1 by receiving an indication of change of physical location of a telephony device (e.g., telephony device 22) subscribed to the telephony communication system. In some exemplary implementations, act 3-1 may comprise the location change detector 60 receiving a notification of change of physical location of the telephony device from another source, e.g., from the telephony device 22 itself. In other exemplary implementations, act 3-1 may comprise the location change detector 60 actually detecting the change of physical location of the telephony device as its manner of receiving the indication of change of physical location. Act 3-2 may comprise prompt signal generator 62 generating a prompt signal configured to request an updated street address location. Act 3-3 may comprise the response handler 64 storing the updated street address location received in response to the prompt.

The prompt signal is transmitted to a communications device, which in some exemplary embodiments may be the telephony device 22. In other exemplary embodiments the communication device may be a computer accessible to the user and in communication with telephony system 20. In yet other example embodiments the communication device may be another telephony device, such as a mobile phone other than telephony device 22. The prompt signal is configured to generate a query or invitation (represented by text box 59 in FIG. 1) to invite the user of the telephony device to provide an updated street address location. The response handler 64 stores the updated street address location received in response to the prompt signal from the user of the telephony device (act 3-3 of FIG. 3). When an emergency call is placed by the telephony device, the call server 52, and the emergency call handler 66 in particular, obtains access to the updated street address location and provides the updated street address location to the emergency service answering point 58.

Whereas FIG. 1 shows an exemplary generic embodiment with a generic telephony device 22, FIG. 1A through FIG. 1D show exemplary embodiments and scenarios in which the telephony system 20 serves specific differing types of telephony devices 22A through 22D, respectively.

Figure 1A:
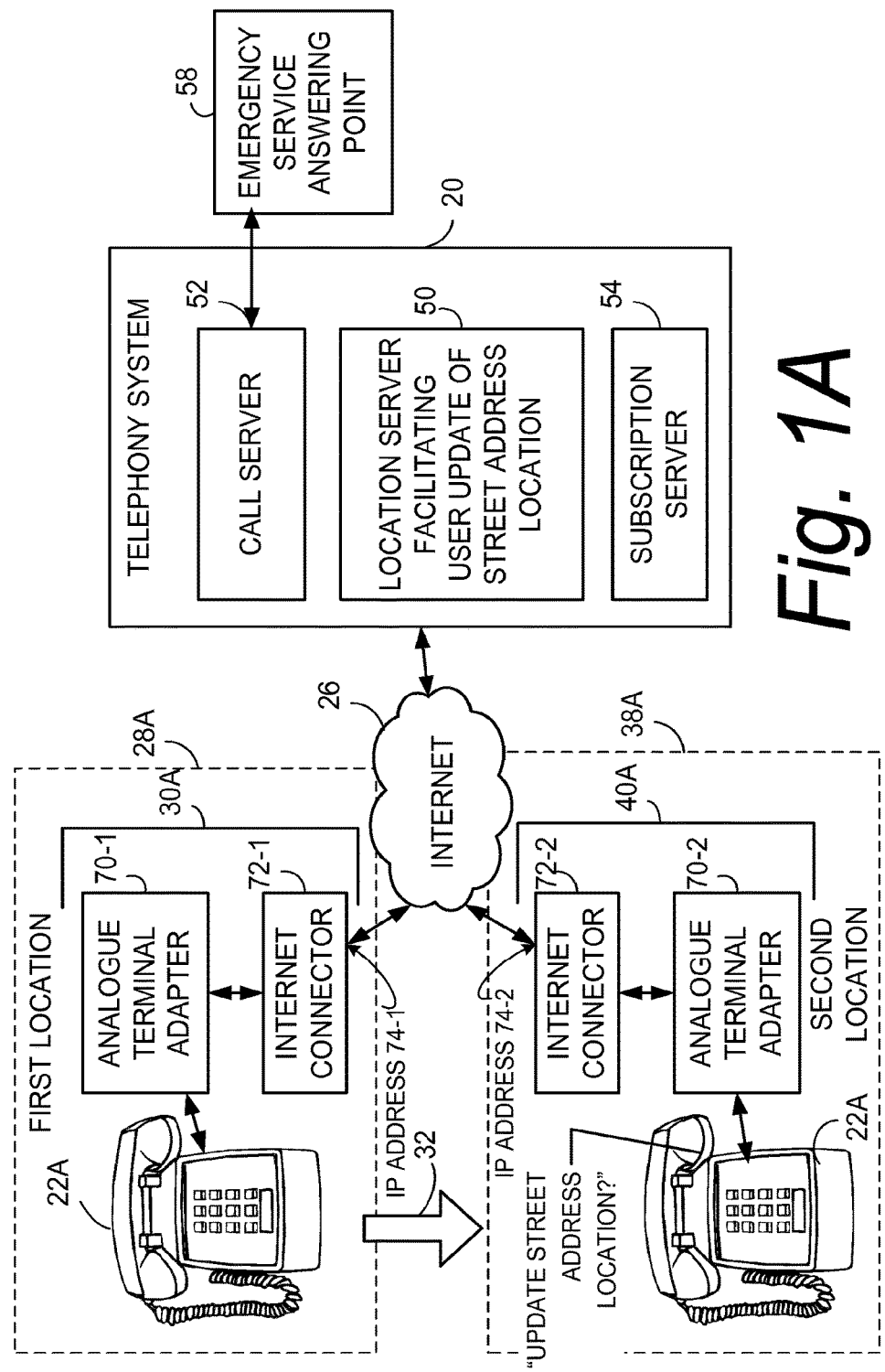
FIG. 1A is a diagrammatic view of an exemplary scenario wherein the radio communications system of FIG. 1 serves a conventional or analog telephony device.

The telephony device 22A of FIG. 1A may be, for example, an analog telephone or conventional telephone of a type suited for plain old telephone service (POTS). The analog telephony device 22A may be connected to Internet 26 through an internet connector and an analog terminal adapter. In particular, at first location 28A the telephony device 22A is connected to analog terminal adapter 70-1, which in turn is connected to Internet connector 72-1. Thus, the first access point 30A at the first location of FIG. 1A comprises analog terminal adapter 70-1 together with Internet connector 72-1. An Internet (IP) address 74-1 is associated with Internet connector 72-1 and thus the access point 30A at first location 28A.

In some embodiments, the functions of the analog terminal adapter 70-1 and the internet connector 72-1 may be combined into a single unit. The analog terminal adapter 70-1 converts analog signals from the analog telephone 22A into data signals that pass over Internet 26, and vice versa. Analog telephone devices include but are not limited to standard telephones and document imaging devices such as facsimile machines. A configuration using Internet connector 72 is common where the analog telephone 22A is located in a residence or business. Other configurations are also possible where multiple analog telephones share access through the same analog terminal adapter 70-1. In those situations, all analog telephones could share the same telephone number, or multiple communication lines (e.g., additional telephone numbers) may be provisioned by the telephony system 20.

After telephony device 22A travels to second location 38A as depicted by displacement arrow 32, at second location 38A the telephony device 22A is connected to analog terminal adapter 70-2, which in turn is connected to Internet connector 72-2. Thus, the first access point 40A at the second location 38A of FIG. 1A comprises analog terminal adapter 70-2 together with Internet connector 72-2. It should be understood that the user may transport both telephony device 22A and analog terminal adapter 70-1 to second location 38A, in which case the analog terminal adapter 70-1 becomes the analog terminal adapter 70-2. An Internet (IP) address 74-2 is associated with Internet connector 72-2 and thus the access point 40A at second location 38A.

Figure 1B:
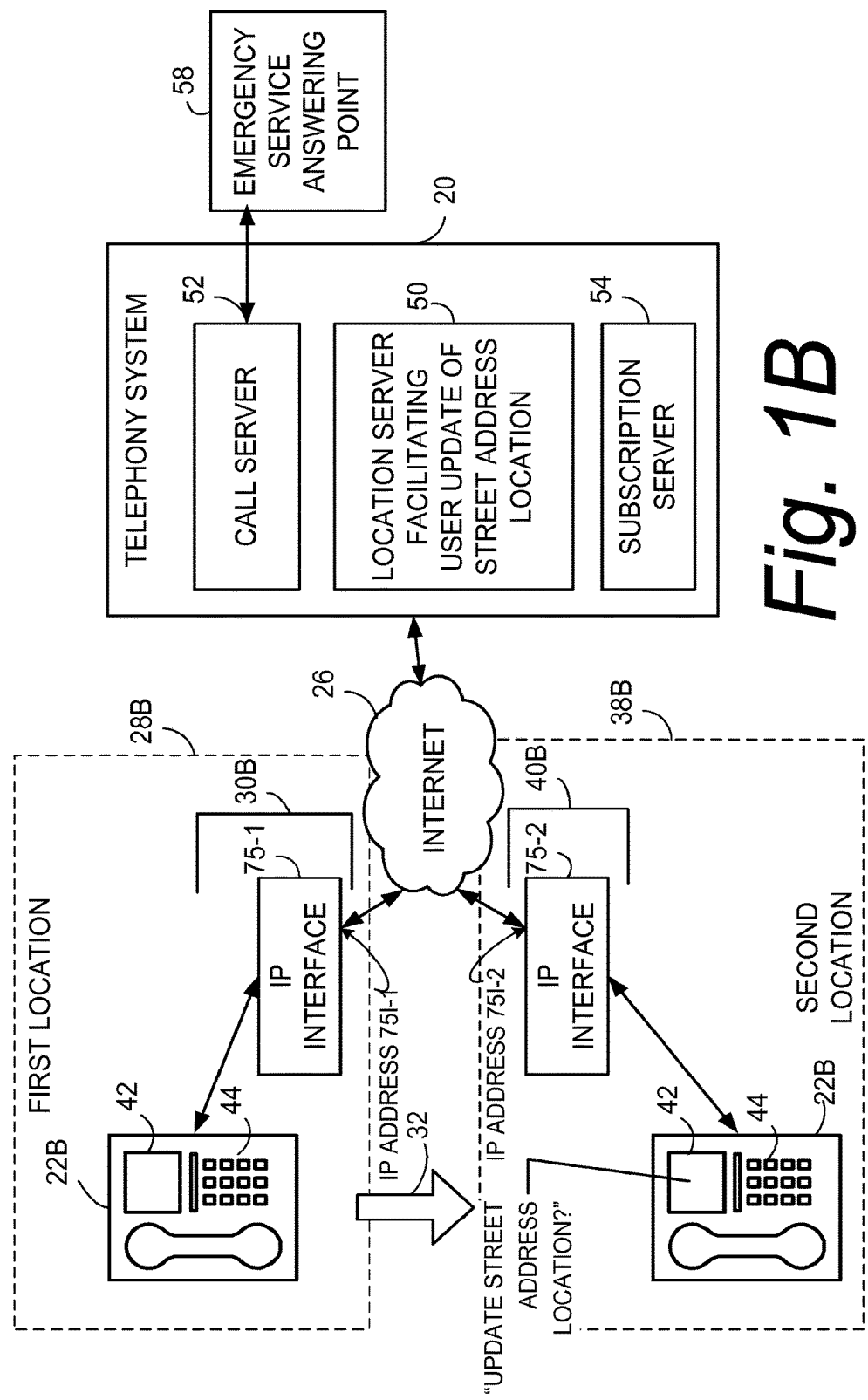
FIG. 1B is a diagrammatic view of an exemplary scenario wherein the radio communications system of FIG. 1 serves an Internet Protocol (IP) telephony device.

The telephony device 22B of FIG. 1B may be, for example, an IP telephony device 22B which is connected to IP interface 75-1 via a wired connector. In other instances, the IP telephony device 22B may be connected at first location 28B to interface 75-1 by a separate wireless router. In yet other instances the interface 75-1 may include its own wireless router. An IP address 751-1 is associated with IP interface 75-1. After IP telephony device 22B travels to second location 38B as depicted by displacement arrow 32, at second location 38B the IP telephony device 22B is connected to IP interface 75-2, which is associated with IP address 751-2.

The telephony device 22C of FIG. 1C may be, for example, a soft-phone client running on computer 76 to place and receive IP based telephone calls, and to access other IP telephony systems (not shown). At the first location 28C the computer 76 is coupled to the Internet via interface 77-1, which is associated with IP address 771-2. The computer 76 may have a wired or wireless connection to the interface 77-1. Also, in some embodiments, a separate wireless router (not shown) could be logically interposed between the computer 76 and the interface 77-1 to the Internet 26. In some instances, the soft-phone client could be assigned its own telephone number. In other instances, the soft-phone client could be associated with a telephone number that is also assigned to an IP telephone, or to a telephone adaptor that is connected one or more analog telephones. After telephony device 22C travels to second location 38C as depicted by displacement arrow 32, at second location 38C the telephony device 22C is connected to IP interface 77-2, which is associated with IP address 771-2.

Figure 1D:
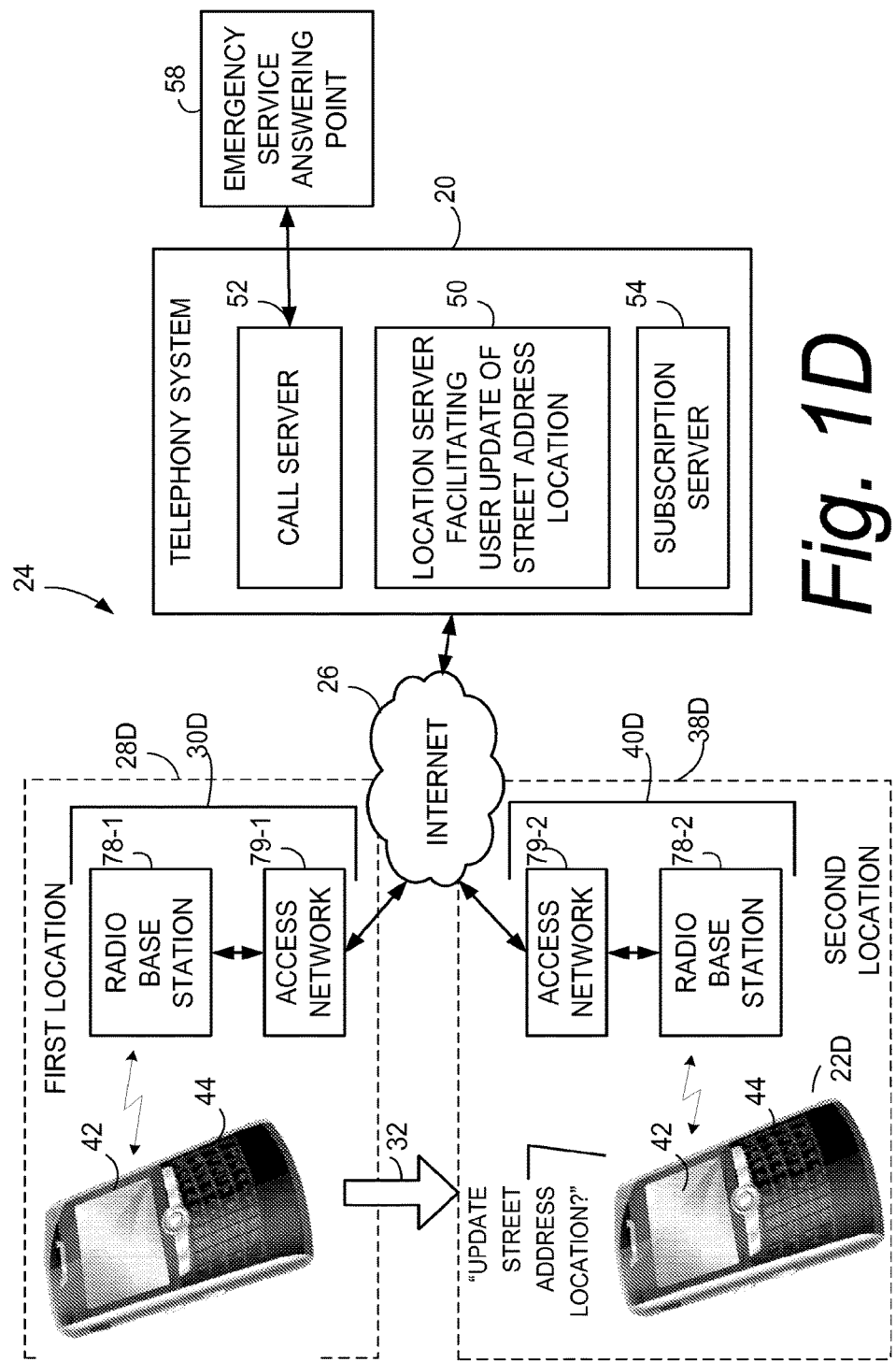
FIG. 1D is a diagrammatic view of an exemplary scenario wherein the radio communications system of FIG. 1 serves a mobile or wireless telephony device.

The telephony device 22D of FIG. 1D may be, for example, a wireless telephony device, such as a cell phone or even a laptop or other computing device with wireless termination. A wireless device is typically in radio communications over a radio or air interface with a wireless access point. The wireless access point may be, for example, a base station of a suitable network, such as a base station of a radio access network (RAN) or a base station/access point of a WiFi or WiMax network, or any other wireless protocol such as ZigBee, Bluetooth, or Dect. For sake of simplicity, all such wireless access points shall herein be referred to as "base station" or "radio base station." The radio access network is connected to a core network or the like, which in turn is connected to or has access to Internet 26. Thus, FIG. 1D depicts the access point 30D for telephony device 22D at first location 28D as comprising radio base station 78-1 and access network 79-1. After telephony device 22D travels to second location 38D as depicted by displacement arrow 32, at second location 38D the telephony device 22D is connected to or served by another base station, e.g., radio base station 78-2, which is connected to access network 79-2. Depending on the extend of physical relocation/displacement of telephony device 22D, the radio base station 78-2 may belong to the same radio access network as does radio base station 78-1, and in such situation and other situations the access network 79-2 may be the same as access network 79-1.

In view of the differing types of telephony devices served by telephony system 20, in differing exemplary embodiments and modes, the receipt of change of physical location of the telephony device may occur in various ways, e.g., using different location change reception schemes for different types of telephony devices. That is, the particular location change reception schemes may depend on the type of telephony device 22 associated with a user's subscription/account. In some of those schemes the location change detector 60 may actually perform or request a detection of change of location as its way of receiving the indication of change of physical location. In other embodiments, the telephony device 22 may discern or detect the change of physical location and notify the location change detector 60 for the location change detector 60 to receive the indication of change of physical location.

A first exemplary way of detecting change of physical location, understood with respect to the scenarios of FIG. 1A through FIG. 1C, comprises receiving an indication of change of network address (e.g., internet address) utilized by the telephony device. For example, as telephony device 22A moves from first location 28A to second location 38A, telephony device 22A is no longer connected to Internet 26 through Internet address 74-1, but instead becomes connected to Internet 26 through Internet address 74-2 at second location 38A. When a call is made using telephony device 22A at second location 38A, packets included in the VoIP packet stream may comprise headers that include the internet address of the packet source, e.g., Internet address 74-2. Upon receipt of packets of the call a change of internet address in packet headers, e.g., a change from Internet address 74-1 to Internet address 74-2, will be detected or recognized, e.g., by location change detector 60. Upon detecting the change in network address (fulfilling act 3-1 of FIG. 3), the prompt of act 3-2 is generated. For example, in an embodiment and mode in which telephony service 20 executes acts of FIG. 3, as act 3-2 the location change detector 60 notifies, e.g., prompt generator 62. Similarly, a change of IP address may be detected for the telephony device 22B and telephony device 22C of the FIG. 1B and FIG. 1C embodiments. Alternatively, the prompt of act 3-2 may be provided only for certain IP address changes. For example, the first IP address 74-1 may be determined to relate to a first physical location (such as a certain city) 28A and the second IP address 74-2 may be determined to related to a second physical location (such as another city) 38A. The location change detector may be configured to only detect a change in IP address as an actual change in physical location upon the two physical locations being distinct; or, potentially, only where the determined distance between the two physical locations meets or exceeds a certain threshold distance.

Figure 1E:
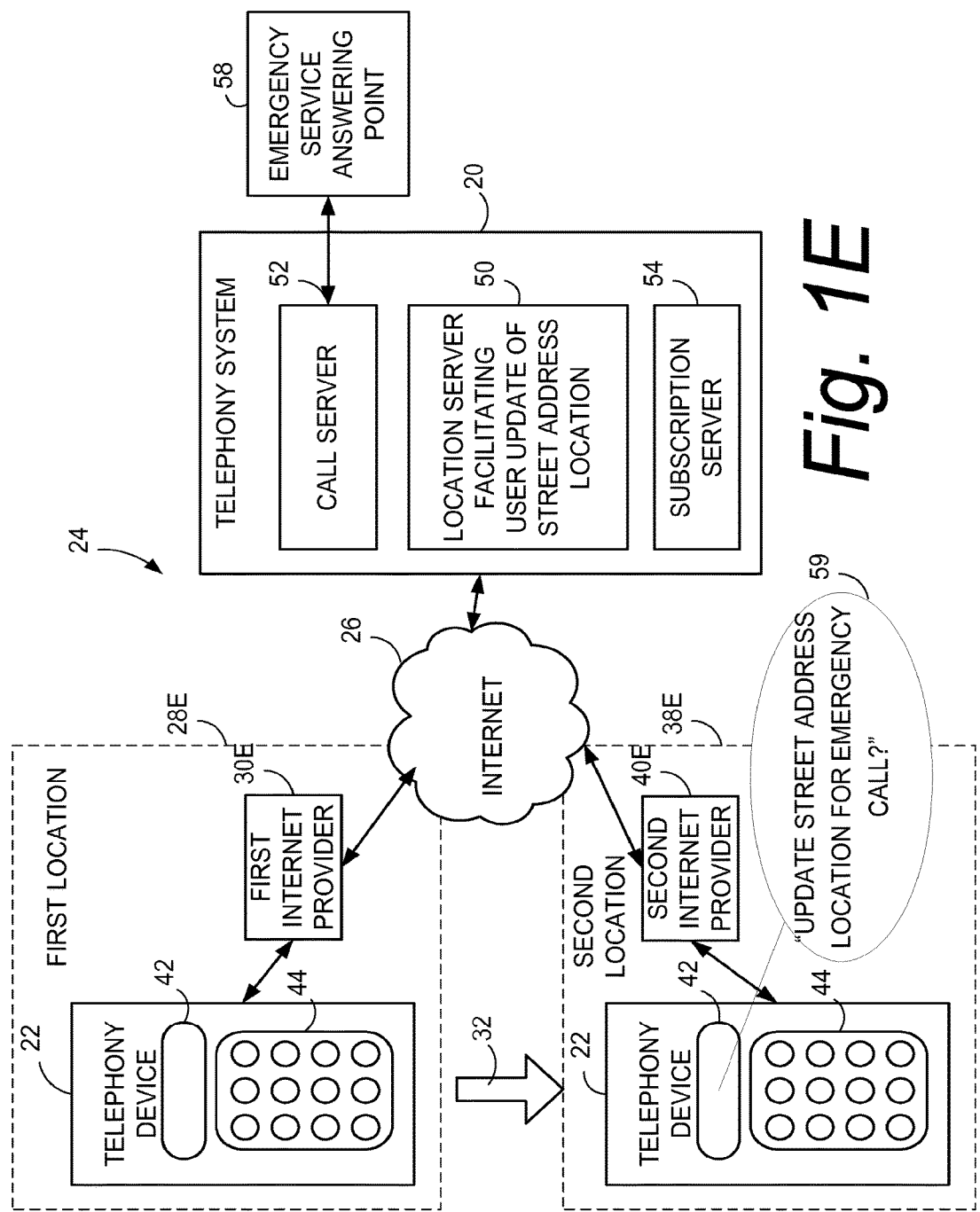
FIG. 1E is a diagrammatic view of an exemplary scenario wherein a change of IP provider is detected.

In some instances a change of network address does not necessarily indicate a change in physical location. For example, some times changes in network address result from network address translation (NAT). Simply put, network address translation (NAT) is a methodology of modifying network address information in Internet Protocol (IP) datagram packet headers while they are in transit across a traffic routing device for the purpose of remapping one IP address space into another. As a result, another exemplary way of detecting change of physical location comprises receiving an indication of change of network provider (e.g., IP provider). This exemplary way of receiving an indication of change of network provider is again understood with respect to the scenarios of FIG. 1A through FIG. 1C and also illustrated more generically by FIG. 1E. For example, as telephony device 22E moves from first location 28E to second location 38E, telephony device 22E is no longer connected to IP provider 30E, but instead becomes connected to Internet 26 through IP provider 40E at second location 38E. When a call is made using telephony device 22E at second location 38E, a change from IP provider 30E to IP provider 40E will be detected or recognized, e.g., by location change detector 60. Thereafter the processing of the call is essentially the same as discussed above. For either or both of determining change of physical address by change of network address or change of network provider, such determination may be facilitated by use of a dynamic Domain Name System service.

The aforedescribed exemplary embodiments and modes of detecting a change of access connection of or change of network provider for the telephony device may be by checking a SIP Register. In these embodiments and modes a user may send a REGISTER MESSAGE with the user's IP address periodically, e.g., every X minutes, to a SIP registration server that may be maintained by the VOIP service. The SIP registration server stores the user's IP address in association with, for example, an account name of the user. Thus, in this embodiment and mode, the location change detector may be communicatively coupled to the SIP registration server such that updates in the user's IP address may be detected by the location change detector. Thus, checking the SIP Register facilitates the passing (and logging) of information that is processed to indicate a change. Alternatively, an Outbound Proxy may act as a registrar.

Second and third exemplary ways of detecting change of physical location may be understood with respect to the scenario of FIG. 1D. A second exemplary way involves use of Global Positioning System (GPS) coordinates. Many wireless devices already have on-board GPS units through which GPS coordinates of the wireless device may be readily obtained. Accordingly, as act 3-1 of FIG. 3 the location change detector 60 of location server 50 may send a signal to obtain from the telephony device 22D its current GPS coordinates as a current physical position, and then compare the current GPS coordinates for the telephony device 22D with a previously stored physical location (e.g., the previous GPS coordinates for the telephony device 22D before the current GPS coordinates were obtained). In other exemplary embodiments of this second way, the telephony device 22D itself may acquire its current GPS coordinates as the current physical position and compare the current GPS coordinates with previously stored GPS coordinates. In either types of embodiments, e.g., either initiated/executed by location change detector 60 or telephony device 22D, the GPS coordinates of telephony device 22D at second location 38D, used as the current GPS coordinates, will differ from former GPS coordinates associated with telephony device 22D at first location 28B. If there is an appreciable difference (for example, beyond a given threshold distance) between the current GPS coordinates and the previous GPS coordinates, the location change detector 60 determines a change of physical location.

A third exemplary of detecting change of physical location, also understood with reference to FIG. 2D, comprises detecting a change of wireless access connection of the telephony device. When telephony device 22D moves from first location 28D to second location 38B, the telephony device 22D will typically utilize a different base station, e.g., at second location 38D telephony device 22D will be served by radio base station 78-2 rather than radio base station 78-1. The location change detector 60 may obtain from the radio access network of the past and current serving base stations the respective identifiers or the like of those base stations, and upon noting a change of base station identifiers may determine a change of physical location of the telephony device 22D. Alternatively, the location change detector 60 may be made aware of any particular signaling involving telephony device 22D that indicates a change of location area or routing area, e.g., location area update (LAU) or routing area update (RAU), which also would indicate a change of physical location of the telephony device 22D.

The subscription server 54 of telephony system 20 maintains subscription or account information for each of the subscribers of telephony system 20. The subscriptions may include or also cover "users", including the user of the various telephony devices 22 herein illustrated or encompassed by this description. The subscription server 54 may comprise or have access to subscription database 80, illustrated in pertinent detail in FIG. 2. As shown in FIG. 2, subscription database 80 may be distinct from subscription server 54, e.g., in a separate memory section 82 of machine hardware 56.

The subscription database 80 stores subscription records for plural subscribers of telephony system 20. For sake of simplicity FIG. 2 shows only one such subscriber record, e.g., record 84 for subscriber "22" (whose account is used by the user of telephony device 22. One or more other telephony devices may also be covered by the same subscription, although there is a different street address location required for each telephony device). Each record 84 may comprise numerous sub-records of information, only some of which are illustrated in FIG. 2. For exemplary, each record 84 may comprise an accounting sub-record 86 which specifies parameters of the subscriber's account, e.g., quality of service, billing information, etc. In addition, each record 84 may comprise equipment type sub-record 85 which may specify, for example, type and model number of telephony device 22, e.g., whether the telephony device 22 is an analog or wireless telephony device, for example. For purposes pertinent to the technology disclosed herein, each record 84 also may include an emergency sub-record 88. The emergency sub-record 88 in turn may comprise numerous fields, including currently registered street address location field 90; a log 91 of past registered street address locations; a log 92 of physical address locations; and one or more fields 93 of user preference information.

Figure 4:
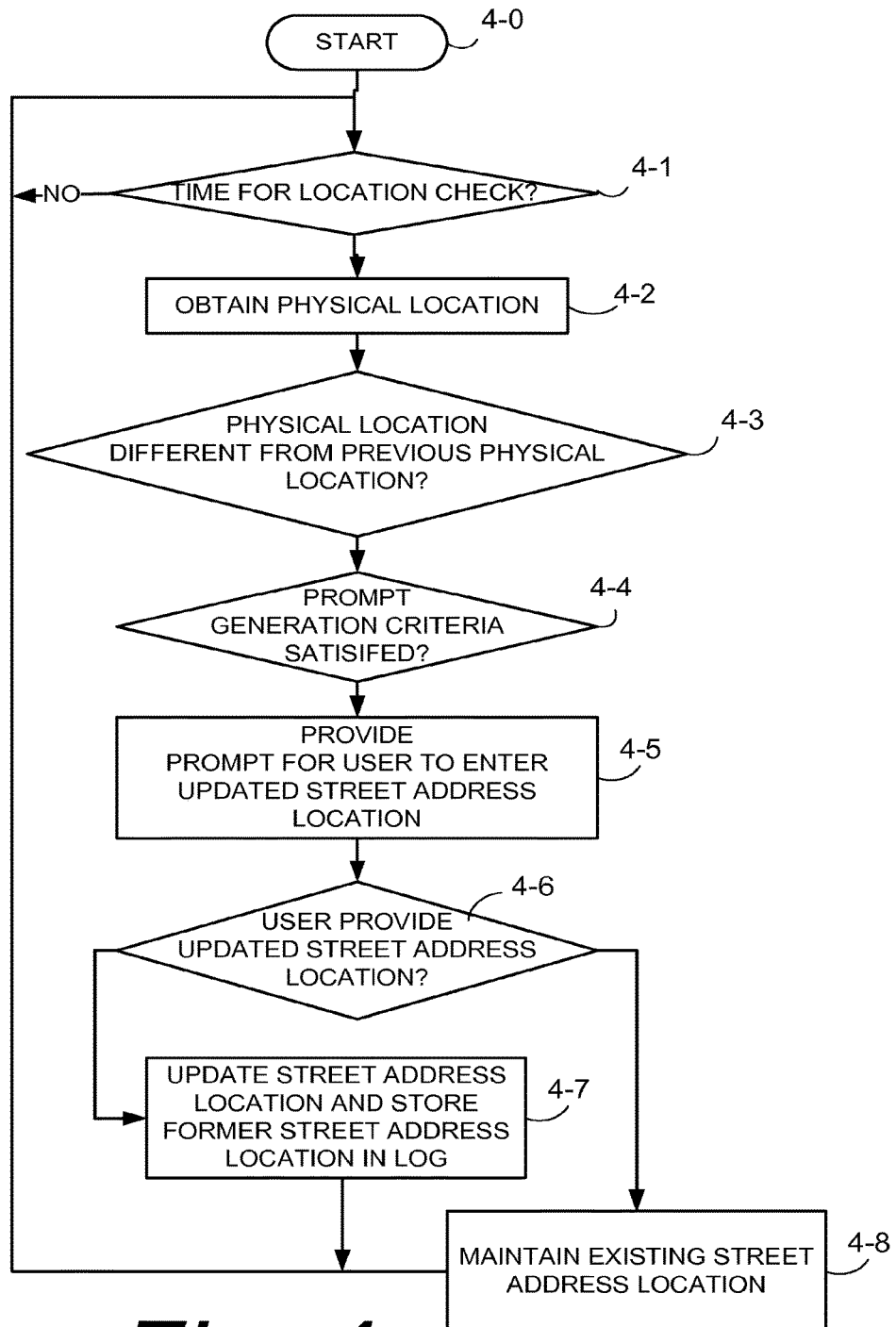
FIG. 4 is a flowchart showing basic exemplary acts or steps comprising a more detailed method of updating street address location upon change of physical location of a telephony device.

FIG. 4 illustrates an exemplary method of the technology disclosed herein according to an exemplary mode, and particularly shows representative acts or steps which may be performed in conjunction with a location monitoring routine. In some exemplary embodiments and mode the location monitoring routine may be performed by location server 50 of telephony system 20; in other exemplary embodiment and modes the location monitoring routing may be preformed, either in whole or in part, by telephony device 22. In other exemplary embodiments and modes, some acts of FIG. 4 may be performed by telephony service 20 and others by telephony device 22. Executable instructions comprising the location monitoring routing may be stored on an appropriate non-transitory computer-readable medium. For the embodiments and modes in which the location monitoring routing is performed, at least in part, by telephony device 22, it will be understood that a memory of telephony device 22 includes at least some information (depicted in FIG. 6B as subscription information 118) comparable to emergency sub-record 88 for the user as stored, e.g., subscription database 80, including user preference information.

Act 4-0 depicts initiation or start of execution of a particular instance of location monitoring route for a particular telephony device 22. It will be understood that an instance of the location monitoring routing may be executed at telephony service 20 for plural subscribers, and at least for participating subscribers who wish to have their current street address location registered, if not all subscribers of telephony system 20.

At act 4-1 a check is made to determine whether it is time to check the present or current physical location of the telephony device 22. If not, execution loops back until such time as location check is appropriate. How often the location monitoring routing checks for a change of physical location may be preconfigured or may be adjustable. For example, the user of telephony device 22 may provide an input or setting that informs the location monitoring routing how often the user wants a location change check to be performed. Such input or setting may be stored in one or more fields 93 of user preference information of record 84, for example. An interrupt is generated to correct to whatever time interval or occasion is indicated to trigger the location check.

If the location monitoring routing determines it is time to check the physical location of the telephony device 22, as act 4-2 the location change detector 60 of telephony service 20 or the location reporter 116 hereinafter described is commissioned to ascertain or investigate the current physical location of telephony device 22. As previously indicated, an indication of the current physical location of telephony device 22 in any of a variety of ways depending on the type of telephony device 22 being monitored. For example, indications of current physical location may be obtained in terms of IP address, GPS coordinates, or network access identifier, for example. For telephony service 20, the physical location determined at act 4-2 may be stored in log 92 of physical address locations of record 84 for telephony device 22. When the location monitoring routing is performed at telephony device 22, the physical location determined at act 4-2 may be stored as user emergency information 118.

As act 4-3 the location monitoring routing determines whether there has been a change of physical location of the telephony device 22 since the last location check. In the case of an analog telephony device 22D which may be connected to a network address, as act 4-3 either the location change detector 60 or the location reporter 116 determines whether the current network address (e.g., IP address) through which telephony device 22D communicates is the same as previously noted. When executed at telephony service 20, such comparison may be facilitated by the log 92 of physical address locations stored in record 84 for the subscriber of the telephony device. If the telephony device 22 is a wireless device such as telephony device 22D of FIG. 1D, on the other hand, as act 4-3 the location change detector 60 may receive an indication of a change in physical location by a change in GPS coordinates or change of access point for the wireless telephony device 22D, as previously described. In such situation, the log 92 of physical address locations includes the last known GPS coordinates or network access point to be used for comparison with currently obtained GPS coordinates or currently obtained network access point. The information provided in equipment type sub-record 85 will apprise location change detector 60 of the nature of the physical address location information stored in log 92 of physical address locations, e.g., whether IP address, GPS coordinates, network access identifier, or the like.

As described below, not every current physical location may necessarily warrant a prompt to invite the user to update the user's street address location. Accordingly, in some exemplary embodiments and modes act 4-4 is executed to determine whether the change in physical location justifies generation of a prompt. In other words, the location change detector 60 or the location reporter 116 may be configured with certain prompt generation criteria which must be satisfied before a prompt is generated. Examples of such prompt generation criteria include a predetermined displacement of the telephony device and/or a predetermined stationary time period for the telephony device. Information germane to the prompt generation criteria may be based on parameters values, either pre-configured or user input, stored in one or more fields 93 of user preference information of record 84 or in user emergency information 118 of telephony device 22.

If it is determined at act 4-4 that the prompt generation criteria is satisfied, the prompt is provided as act 4-5. The prompt is interpreted by telephony device 22 to cause presentation of an output, for example audio or visual output, to telephony device 22 to request or at least give the user an opportunity to enter a current street address location. Such invitation or prompt may be represented, for example, in the manner illustrated by text box 59 in FIG. 1. In response to the inquiry, invitation, or prompt the user may enter the current street address location e.g., a street address; street name; floor, suite, apartment or office number (if applicable); city; state; country, and zip code, or the like. As described above, the prompt may be presented on output interface 42 of the telephony device 22, or on an output interface of another communication device such as stationary computer 102 or a mobile phone other than telephony device 22. For example, using a mobile phone the current street address location may be entered using a text or SMS message. The device through which the current street address location is entered returns the entered current street address location, ultimately to location change detector 60 of telephony service 20.

Any response of the user is ultimately received by response handler 64 of location server 50. If it is determined as act 4-6 that the response indeed includes a current street address location, the received current street address location is stored in currently registered street address location field 90 of record 84. In addition, the former street address location is stored in log 91 of past registered street address locations. If the user fails to provide a response, the existing street address location in currently registered street address location field 90 remains the current street address location as depicted by act 4-8.

The location monitoring routing continues to operate in the manner depicted by FIG. 4. In some exemplary embodiments and mode one or both of the user or telephony system 20 may have a prerogative of terminating operation of the location monitoring routine.

It was mentioned above in conjunction with act 4-4 that, in some exemplary embodiments and modes, prompt generation criteria may need to be satisfied before a prompt signal is generated and sent to telephony device 22. Examples of such prompt generation criteria include predetermined displacement of telephony device 22 and predetermined stationary time period for telephony device 22.

It will be appreciated, for example, that non-appreciable displacement of a telephony device, such as from one room of a house to another, or displacement of a few feet within a same premises, should not cause generation of a new prompt. Needless and impractical inquires of the user for entry of current street address location are neither endearing nor warranted, either in terms of benefit or increased telephonic signaling. Therefore, the prompt generation criteria may be consulted as a rule or threshold for determining how far the telephony device 22 must move to justify generation of a prompt. Information reflecting the prompt generation criteria, e.g., a specified number of feet displacement, for example, may be pre-configured and/or stored by user-input in one or more fields 93 of user preference information.

Another example of prompt generation criteria is that of predetermined stationary time period. FIG. 5 illustrates, by way of example, a user not wanting to be bothered with prompts for current street address location while traveling, e.g., while en route from first location 28 to second location 38. However, upon completion of travel and after the user has remained stationary for a predetermined stationary time period, the user may be receptive to a prompt for entering a new current street address location. In other words, as act 4-4 it may need to be determined that a predetermined stationary time period has elapsed since detection of the change of physical location of the telephony device. The predetermined stationary time period may be pre-configured or user-input and stored, for example, in one or more fields 93 of user preference information of record 84.

Figure 6A:
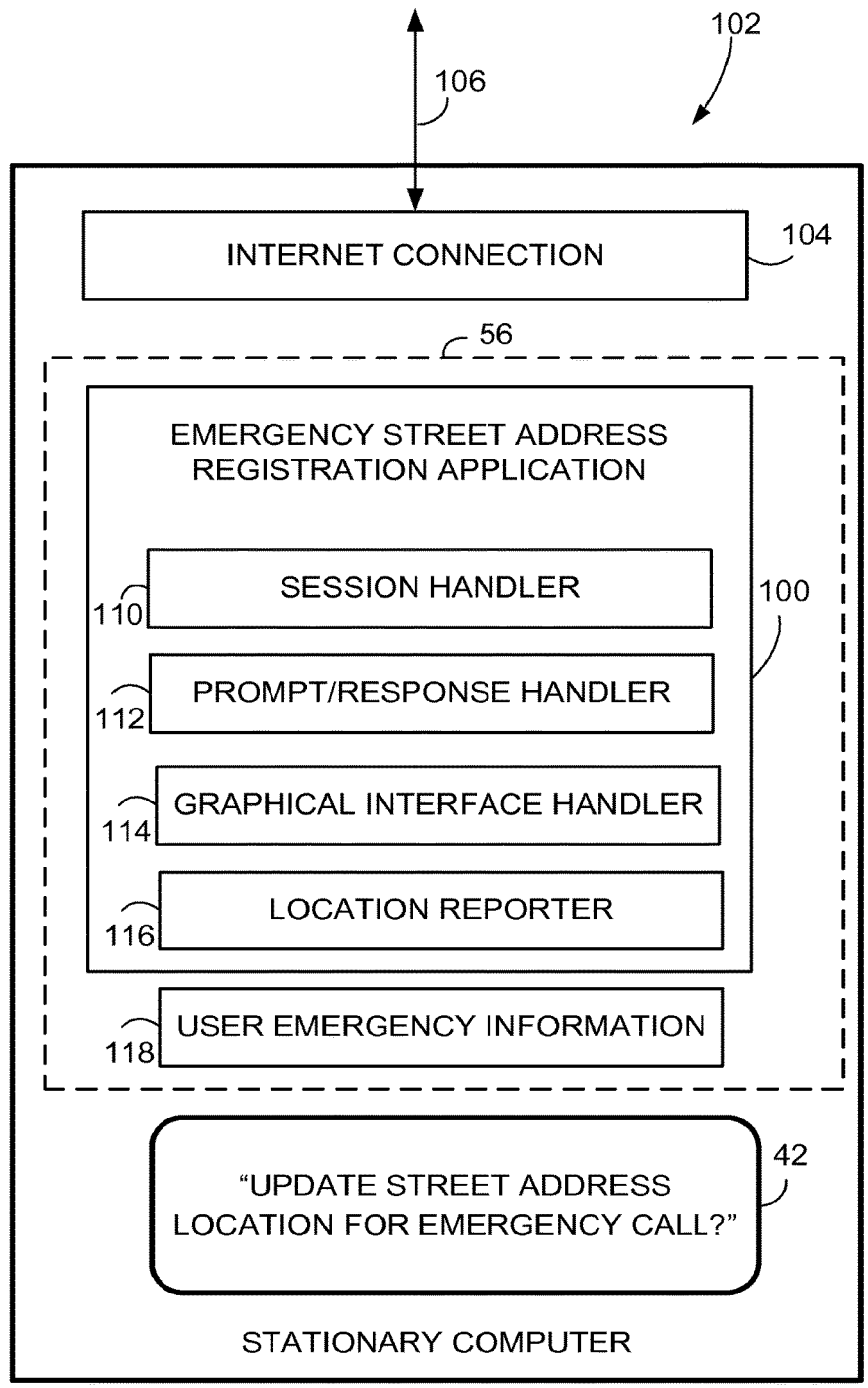
FIG. 6A and FIG. 6B are schematic views of a computer and a wireless telephony device which may execute an emergency street address registration application according to exemplary embodiments and modes.
Figure 6B:
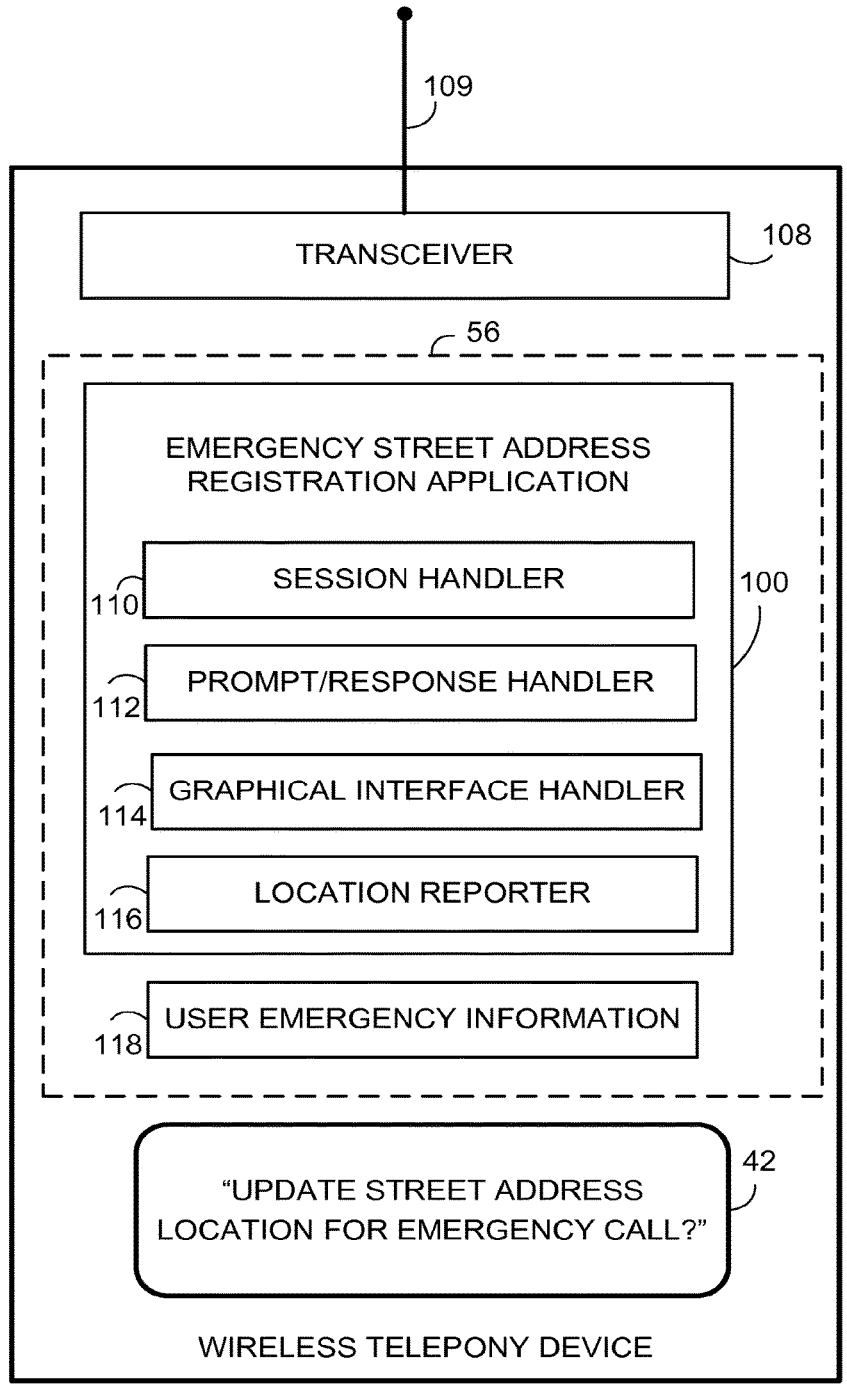

In another of its aspects the technology disclosed herein concerns an emergency street address registration application 100. The emergency street address registration application 100 may be executed at a computer (e.g., stationary computer 102) in the manner shown in FIG. 6A, or at the telephony device 22. In this latter regard, FIG. 6B illustrates execution of emergency street address registration application 100 at telephony device 22D of FIG. 1D, for example. In both exemplary implementations, the emergency street address registration application 100 is stored on non-transitory computer readable storage medium and is executed by machine hardware 56. The stationary computer of FIG. 6A comprises an appropriate internet connector 104 which is connected to Internet 26 over an appropriate internet cable 106. As understood in conjunction with the previous discussion of FIG. 1D, the telephony device 22D comprises radio transceiver 108 which (using one or more antenna 109) communicates with radio base station 78, and through access network 79 to Internet 26. Both stationary computer 102 and telephony device 22D comprise output interface 42 through which prompt, inquiry, or invitation to enter the current street address location may be provided to the user and an input interface 44 through which the user may respond.

Whether executed at stationary computer 102 or telephony device 22D, the emergency street address registration application 100 is illustrated as comprising the following functional units or entities: session handler 110; prompt/response handler 112; graphical interface handler 114; and location reporter 116. The session handler 110 essentially opens the emergency street address registration application 100 and the communication protocols with telephony system 20.

The emergency street address registration application 100 comprises instructions which are stored on a non-transitory storage medium. The instructions of emergency street address registration application 100, when executed (e.g., by the processor of machine hardware 56), perform the basic or representative acts of: (a) authorizing the telephony system to be informed of a change of physical location of a telephony device subscribed to the telephony communication system; (b) providing a prompt signal configured to invite the user of the telephony device to provide an updated street address location; (c) configuring a graphical interface for the user to enter the updated street address location; and, (d) upon entry updated street address location, transmitting the updated street address location received to the telephony system.

Figure 7:
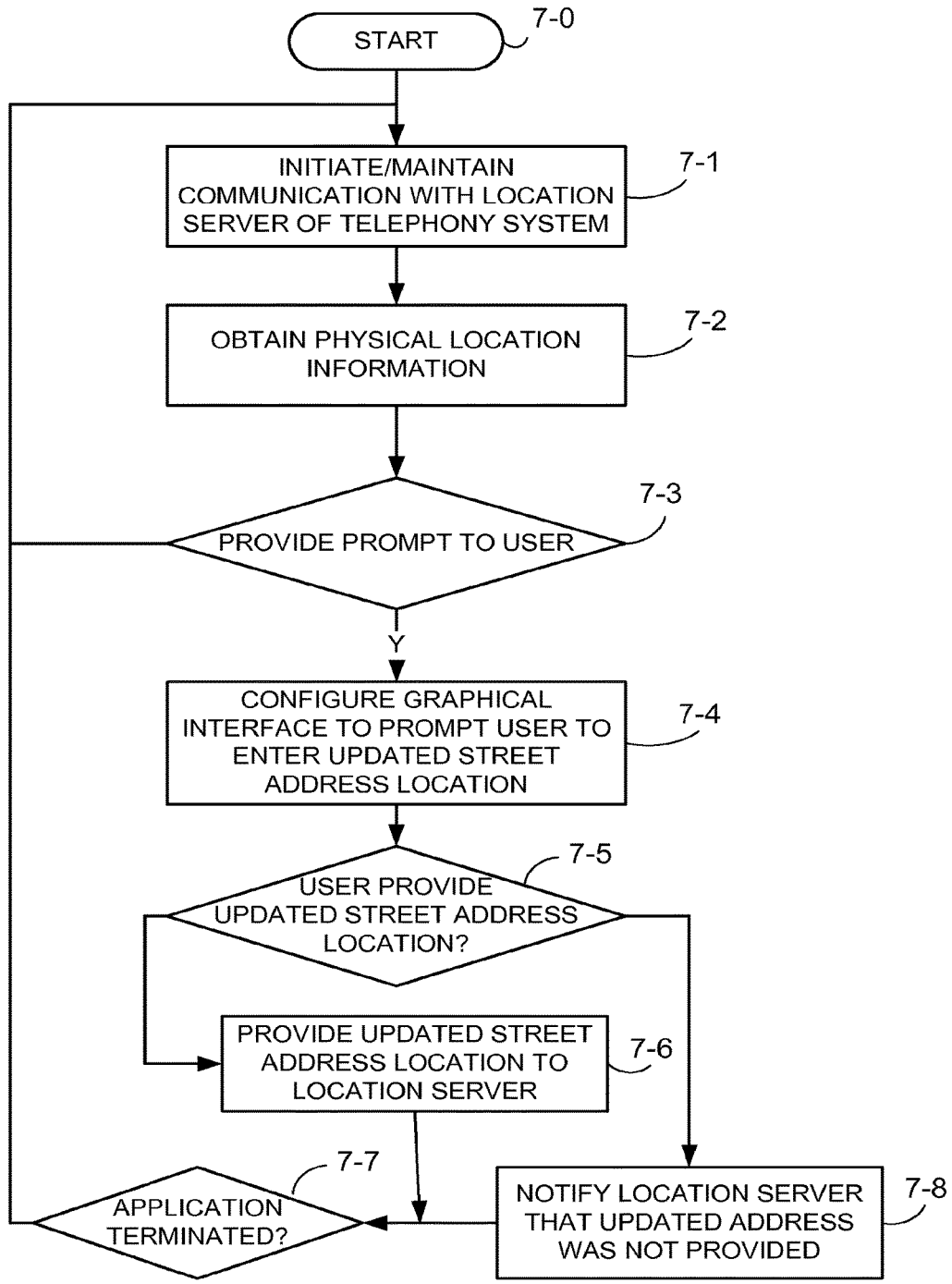
FIG. 7 is a flowchart showing basic exemplary acts or steps comprising an emergency street address registration application which may be executed by a communications device according to an exemplary embodiment and mode.

FIG. 7 shows, in more detail, exemplary acts involved in execution of emergency street address registration application 100. Act 7-0 signifies start or turn-on of execution of emergency street address registration application 100. As act 7-1 the session handler 110 initiates communication with location server 50 of telephony system 20. Act 7-2 depicts the location reporter 116 obtaining and then, optionally providing current physical location information (e.g., IP address, GPS coordinates, etc.) to location change detector 60. For example, the location reporter 116 may communicate with GPS satellites to ascertain the GPS coordinates. In some exemplary embodiments, the location change detector 60 may be able to ascertain the current physical location information without assistance from telephony device 22, e.g., from the radio access network which may advise of base station identifier or the like which serves telephony device 22D.

As act 7-3 the prompt/response handler 112 determines whether to provide a prompt, query, or invitation to the user for the user to enter the current street address location. In some exemplary implementations as act 7-3 the prompt/response handler 112 may issue the query or invitation based on the fact that the location server 50 of telephony service 20 issued a prompt signal. In other exemplary implementations the decision of act 7-3 may be based on whether prompt generation criteria such as that described with reference to act 4-4 has been satisfied in view of the physical location information obtained as act 7-2. If the prompt, query, or invitation is not to be provided, execution resumes with act 7-1. If the prompt, query, or invitation is in fact to be provided, as act 7-4 graphical interface handler 114 configures a graphical interface, e.g., output interface 42, to display to the user the prompt to enter the current street address location. As act 7-5 the graphical interface handler 114 determines whether the user in fact entered data in response to the prompt or inquiry. If so, as act 7-6 the prompt/response handler 112 communicates the current street address location and any other pertinent information to response handler 64 of location server 50. If not, the prompt/response handler 112 notifies the response handler 64 that a response was not provided. As act 7-7, the emergency street address registration application 100 checks whether its execution has been terminated by the user.

It should be appreciated that the acts of FIG. 7 need not necessarily be executed in the order illustrated by way of example. For example, act 7-1 (initiating communication with location server) may occur later than shown, e.g., after it is determined that information in the form of an updated current street address location has actually been obtained.

It was mentioned above that the user may observe or hear the prompt or invitation to enter a current street address location via output interface 42, and may in response to the prompt enter a response using input interface 44. In some exemplary embodiments and modes the user may enter the full current street address location, e.g., by using a keyboard. In other exemplary embodiments and modes, the prompt may take the form of plural pre-populated choices of addresses (e.g., a list of one or more choices of addresses. e.g., user "favorite" addresses) based on (i) pre-stored addresses (e.g., commonly-visited or previously-visited addresses), which may be stored locally or on the network; or (ii) a set of addresses at which the user may be located, based upon his determined location. Such additional address choices may be stored in and extracted from, for example, log 91 of past registered street address locations of record 84.

Some or all of the information stored in subscription database 80, or otherwise utilized by the methods described herein, may be externally stored, e.g., in a cloud server of the like.

In some embodiments, the determination/prompting for the current street address location may be made when the 9-1-1 call is actually being made. There is a possibility for the E9-1-1 message to include LAT/LON coordinates. It can be detected, for example, in the 9-1-1 call that the IP address is very far from the stored location, and then pass the LAT/LON based on GPS in that case. The 9-1-1 operator will have the information both from the message, and from the database lookup, and can make a determination as to where the user might be.

In the embodiments described above the most recently stored street address associated with the telephony device 22 is reported when making an emergency call. For example, with reference to FIG. 2 the currently registered street address as stored in currently registered street address location field 90 is reported to emergency answering service point 58. It will be appreciated that in some situations the most recently stored street address is not necessarily associated with the current physical address location. For that reason, in other example embodiments and modes described herein, some of which are known as "location aware reporting" embodiments and modes, the street address that is sent to the emergency service answering point 58 upon making an emergency call is the street address that is associated with the current physical address location of the telephony device 22, rather than the most recently stored street address.

Figure 10:
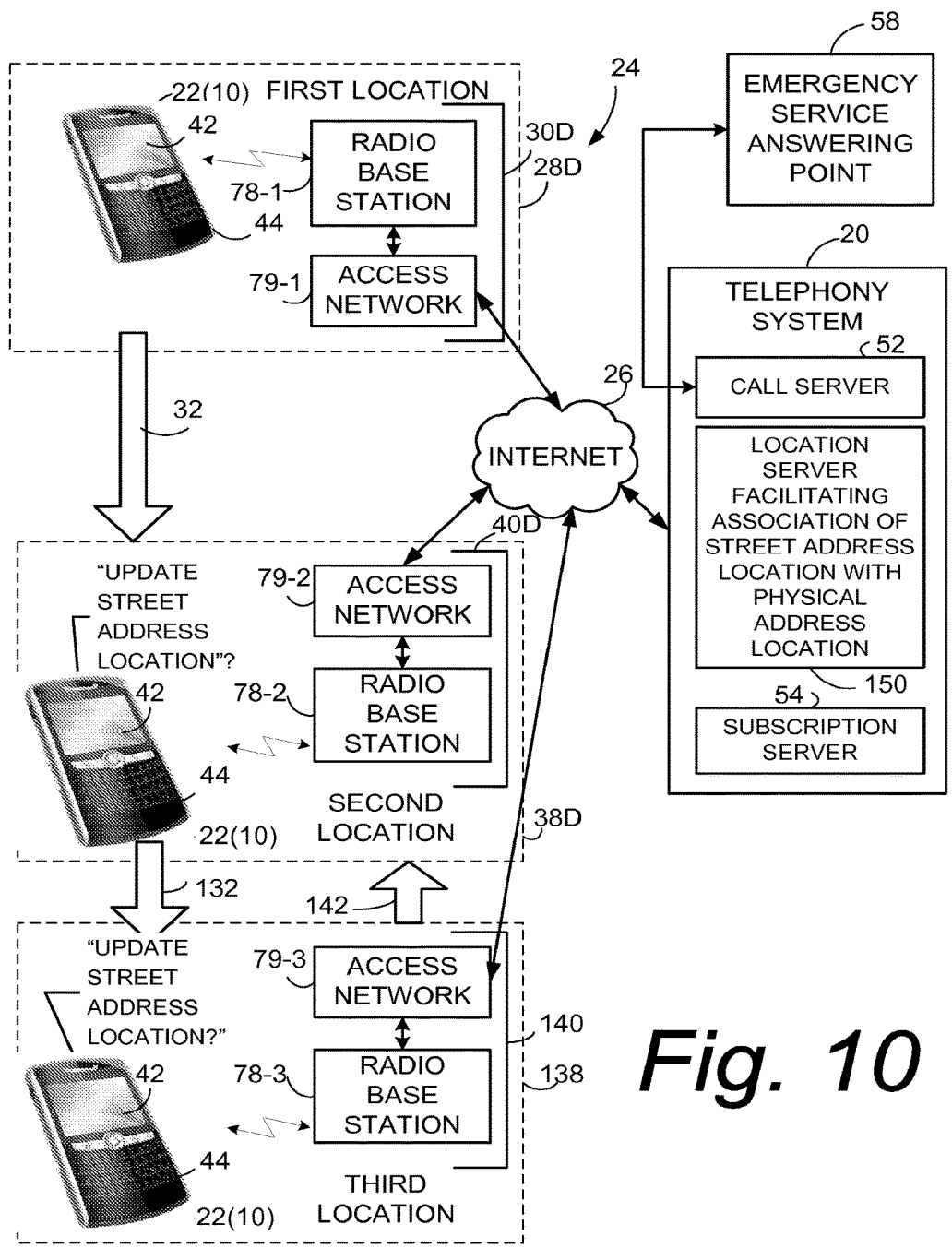
FIG. 10 is a diagrammatic view of an example radio communications system comprising a telephony system which implements "location aware reporting" for emergency call placement.

FIG. 10 shows an example implementation of a "location aware reporting" embodiment and mode, and in particular shows a telephony device 22(10) such as telephony device 22D of FIG. 1D which travels between plural locations, e.g., between plural physical address locations. The telephony device 22(10) of FIG. 10 is illustrated as being a wireless telephony device such as telephony device 22D of FIG. 1D. When at first location 28D the telephony device 22(10) is in communication via access point 30D (comprising a radio base station and access network) with Internet 26. FIG. 10 further shows by displacement arrow 32 that telephony device 22(10) travels to second location 38D whereat the telephony device 22D is connected to or served by another base station, e.g., radio base station 78-2, which is connected to access network 79-2. As shown by arrow 132, telephony device 22(10) then travels to third location 138 whereat the telephony device 22(10) is connected to Internet 26 through access point 140 (comprising radio base station 78-3 which is connected to access network 79-3). Thereafter, as shown by arrow 142, telephony device 22(10) returns back to second location 38D.

For sake of illustration the telephony device 22(10) of FIG. 10 has been represented as a wireless telephony device. However, in variations of the implementation the telephony device 22(10) may take other forms of mobile devices, such as any of the telephony devices 22A-22E. It will further be appreciated that in such variations the nature of the corresponding access point may change in accordance with the respective descriptions of FIG. 1A-FIG. 1E.

FIG. 10 further shows that whether at first location 28D, second location 38D, or third location 138 the telephony device 22(10) may be connected through Internet 26 to telephony system 20. Like telephony system 20 of FIG. 1, the telephony system 20 of FIG. 10 comprises a location server, call server 52, and subscription server 54. The location server 150 of telephony system 20 of FIG. 10 differs from the location server 50 of FIG. 2 in being described and functioning as a location server which facilitates association of street address location with physical address location. The location server 150 is thus one type of "location aware" location server.

Figure 11:
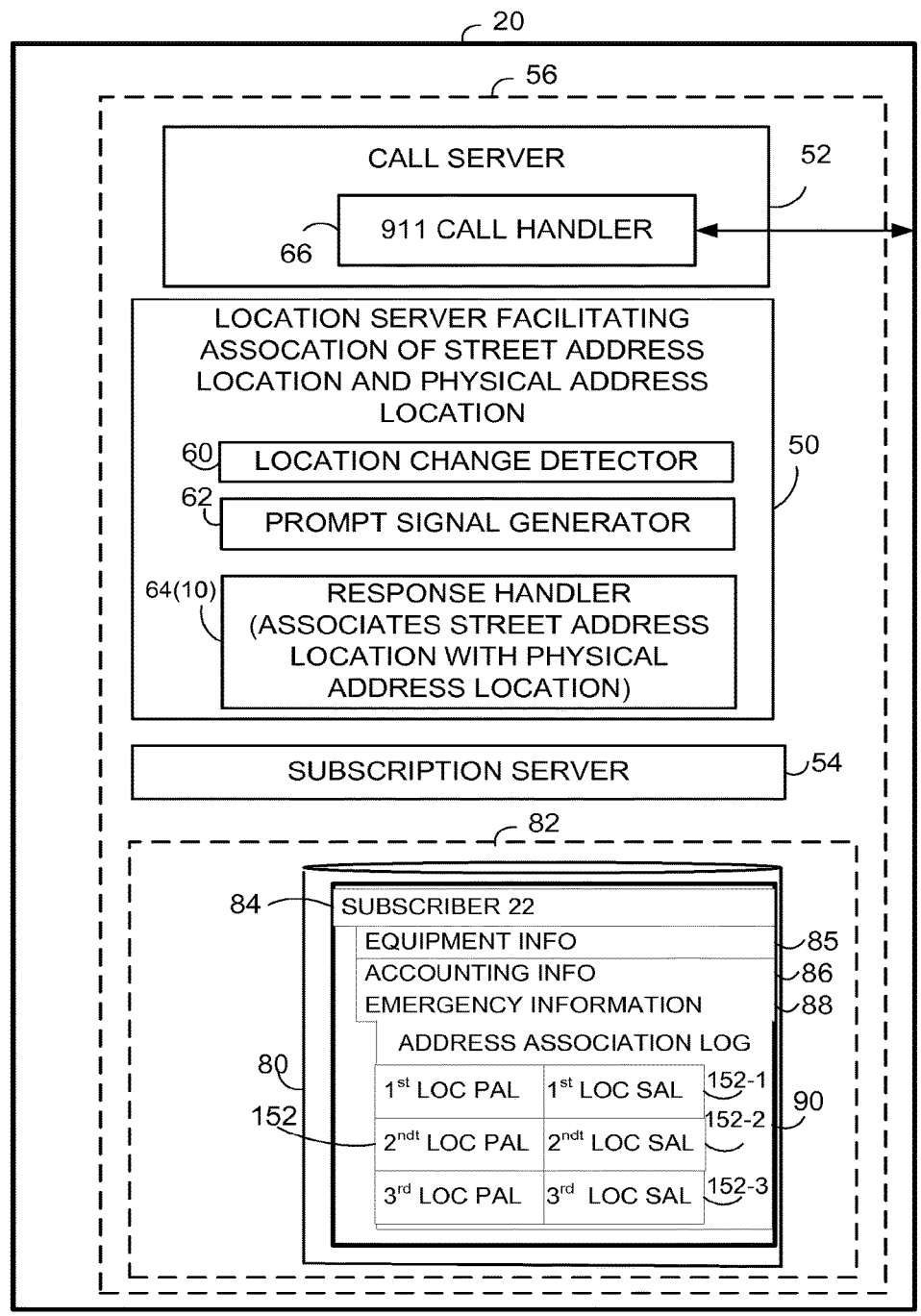
FIG. 11 is a schematic view of an example embodiment of the telephony system of FIG. 10.

As shown in more detail in FIG. 11, location server 150 of FIG. 10, like location server 50 of FIG. 2, may comprise location change detector 60, prompt signal generator 62, and a response handler. The response handler 64(10) serves, e.g., to associate a street address location with a physical address location for locations visited by telephony device 22(10). FIG. 11 also shows that the emergency sub-record 88, stored in record 84 of subscription database 80 for subscriber 22, comprises a log of physical address location and street address location associations, also known as address association log 152. Each row of address association log 152 comprises a pairing of a physical address location and its corresponding street address location.

Figure 8:
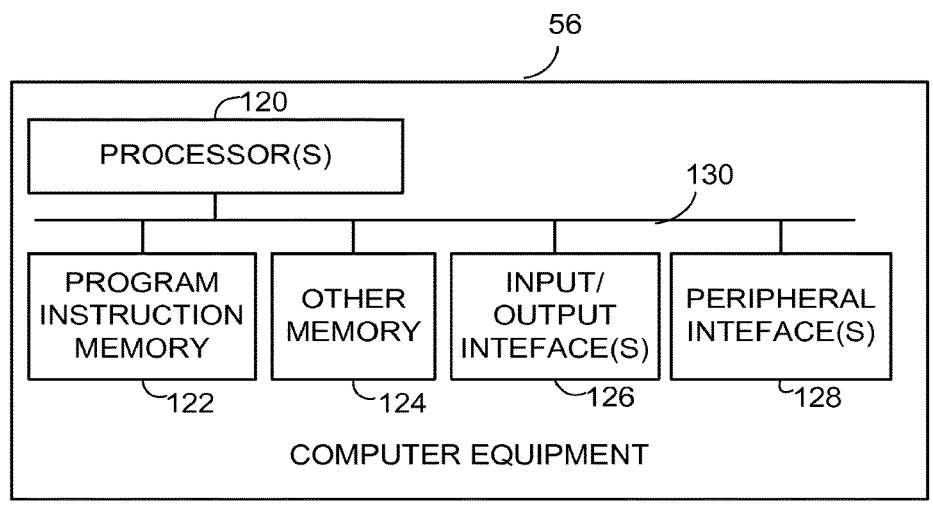
FIG. 8 is a schematic view of a basic embodiment of a computer platform which may comprise telephony apparatus including a telephony system and a wireless telephony device.
Figure 12A:
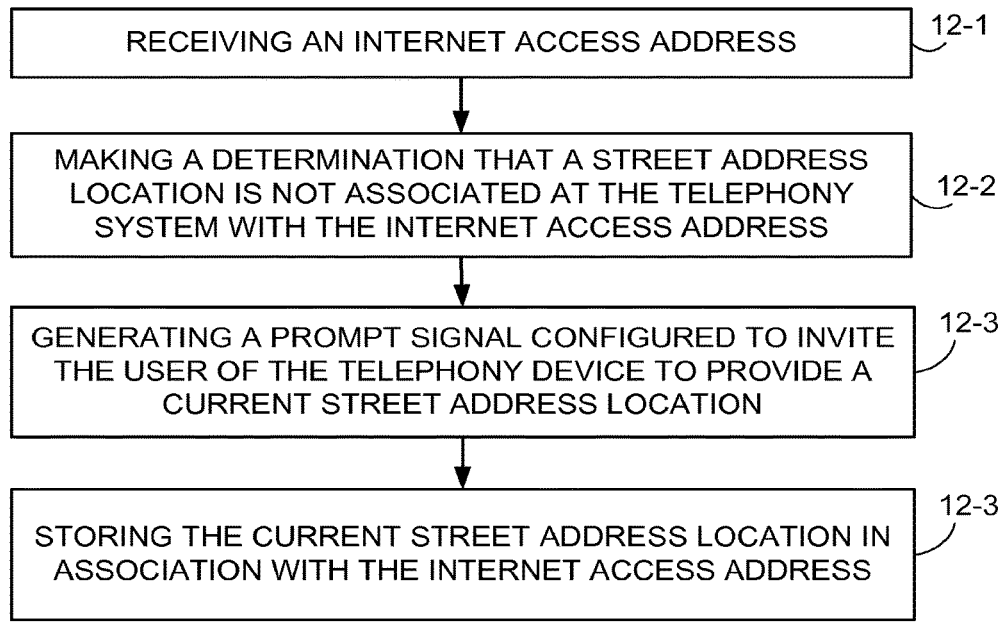
FIG. 12A and FIG. 12B are flowcharts showing basic exemplary acts or steps comprising modes of methods of operating the telephony system of FIG. 10.
Figure 12B:
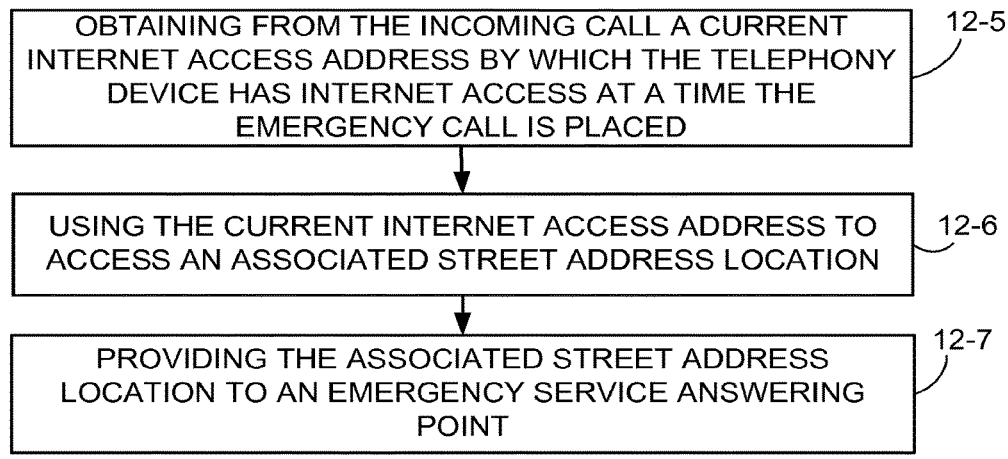

FIG. 12A and FIG. 12B illustrates example, representative, basic acts or steps which may be performed in a method of the example embodiment and mode of FIG. 10. In an example embodiment and mode, acts 12-1 through 12-4 of FIG. 12A may be performed by location server 150 and acts 12-5 through 12-7 of FIG. 12B may be performed by call server 52. As explained herein, both location server 150 and call server 52 may comprise machine hardware 56 and as such may comprise one or more processors 120 as shown in FIG. 8.

Act 12-1 comprises, upon telephony device 22(10) accessing the Internet, the telephony system 20 receiving an Internet access address by which a telephony device subscribed to the telephony communication system is connected to the Internet. As explained herein, accessing Internet 26 may be through an access point 30, 40, or 140. The IP address through which the telephony device 22(10) makes access to Internet 26 is included in the IP packets received from the access point. The IP address utilized by the telephony device 22(10) serves as the physical address location for the telephony system 20 at the time of access.

Act 12-2 comprises making a determination that a street address is not already associated at the telephony system 20 with the Internet access address. In other words, for act 12-2 location server 150 searches address association log 152 to determine if there is already an entry for the IP address received at act 12-1 and a corresponding street address location.

Act 12-3 comprises, as a result of a determination that a street address location is not already associated, generating a prompt signal configured to invite the user of the telephony device to provide a current street address location. As understood with previously described act 7-4, the prompt signal causes generation, e.g., on output interface 42, of a prompt, query, or invitation to the user to enter the current street address location.

Act 12-4 comprises storing the current street address location, received in response to the prompt signal from the user of the telephony device, in association with the Internet access address. In particular, as act 12-4 the location server 150 stores the current street address location received in response to the prompt signal with the physical address location (e.g., the current IP address) in a row of address association log 152.

As mentioned above, acts 12-5 through 12-7 of FIG. 12B may be performed by call server 52 and in particular may be performed when an emergency call is placed by telephony system 20. Act 12-5 comprises obtaining from the incoming call a current Internet access address by which the telephony device has Internet access at a time the emergency call is placed.

Act 12-6 comprises using the current Internet access address to access an associated street address location. That is, using the current Internet access address as the physical address location, the location server 150 checks in address association log 152 to determine if there is a corresponding or associated street address location. For example, if the location server 150 locates a row in which the current Internet access address is stored, the location server 150 extracts the street address location from the same row. If the location server 150 does not find the current Internet access address in address association log 152, the location server 150 may at that time request that the prompt signal generator 62 to issue a prompt for the user of telephony device 22(10) to enter a current street address location.

Act 12-7 comprises call server 52, and 911 call handler 66 in particular, providing the associated street address location (obtained at act 12-6) to emergency service answering point 58 in conjunction with an emergency call.

FIG. 10 illustrates a scenario in which the acts of FIG. 12 may be performed, and also illustrates how the address association log 152 of FIG. 11 may be populated for the scenario of FIG. 10. It is assumed that first location 28D of FIG. 10 is a "home" location for telephony device 22(10), and that both a first location physical address location (1st LOC PAL) and a first location street address location (1st LOC SAL) have been stored in a first row 152-1 of address association log 152. The telephony device 22(10) then moves from the first location 28D to the second location 38D, as indicated by arrow 32. For sake of illustration it may be that the second location is a business location or an office for the user. Upon detection of a new network address at the second location, the user of telephony device 22(10) is prompted to enter a current street address location for the second location (act 12-3). The user enters the current street address location, which as act 12-4 is to be associated with the physical address location of the second location. The response handler 64(10) receives and the street address location and then associates the received street address location of the second location with physical address location of the second location, and causes an entry for the second location to be made in location server 150, as reflected by row 152-2 of address association log 152 (see FIG. 11).

FIG. 10 further illustrates by arrow 132 that the user of telephony device 22(10) travels from second location 38D to a third location 138. The third location 138 may be, for example, a business establishment, restaurant, store, or other residence. When the user of telephony device 22(10) makes access to Internet 26 through access point 140, the user of telephony device 22(10) is prompted to enter a current street address location for the third location (act 12-3). The user enters the current street address location, which as act 12-4 is associated with the physical address location of the third location. The response handler 64(10) associates the physical address location of the third location with the current street address location received from the user in the response, and causes an entry for the third location to be made in subscription server 154, as reflected by row 152-3 of address association log 152 (see FIG. 11).

FIG. 10 further illustrates yet further by arrow 142 that, after visiting third location 138, the user of telephony device 22(10) travels returns to second location 38D.

Suppose at this point in time, after the user has returned to second location 38D, an emergency call is placed using telephony device 22(10). In previously described embodiments the placing of the emergency call would have resulted in the most recently entered street address location (which is stored in the currently registered street address location field 90 of emergency information record 88 of FIG. 2) being reported to the emergency service answering point 58. For this point in time, that most recently entered street address location may have been the street address location of third location 138. But in accordance with the example embodiment and mode of FIG. 10, the more accurate street address location of the second location 38D is instead reported to the emergency service answering point 58.

In the FIG. 10 example embodiment and mode, placing of an emergency call using telephony device 22(10) involves performing acts 12-5 through 12-7. The act of placing of the emergency call may constitute the first access to Internet 26 as described above. Alternatively, placing the emergency call may be a subsequent access to Internet 26. In either situation, acts 12-5 through 12-7 are performed. Act 12-5 comprises obtaining from the incoming emergency call a current Internet access address (an Internet address associated with access point 40) by which telephony device 22(10) has Internet access at a time the emergency call is placed. Act 12-6 comprises using the current Internet access address (the Internet address associated with access point 40) to obtain an associated street address location in location server 150. That is, using the current Internet access address as the physical address location, the location server 150 checks in address association log 152 to determine if there is a corresponding or associated street address location. For this example emergency call location server 150 locates row 152-2 in which the current Internet access address ($2^{nd}$ LOC PAL) is stored, and the location server 150 extracts the street address location ($2^{nd}$ LOC SAL) from the same row. Act 12-7 comprises call server 52, and 911 call handler 66 in particular, providing the associated street address location (i.e., the $2^{nd}$ LOC SAL obtained at act 12-6) to emergency service answering point 58.

Figure 13:
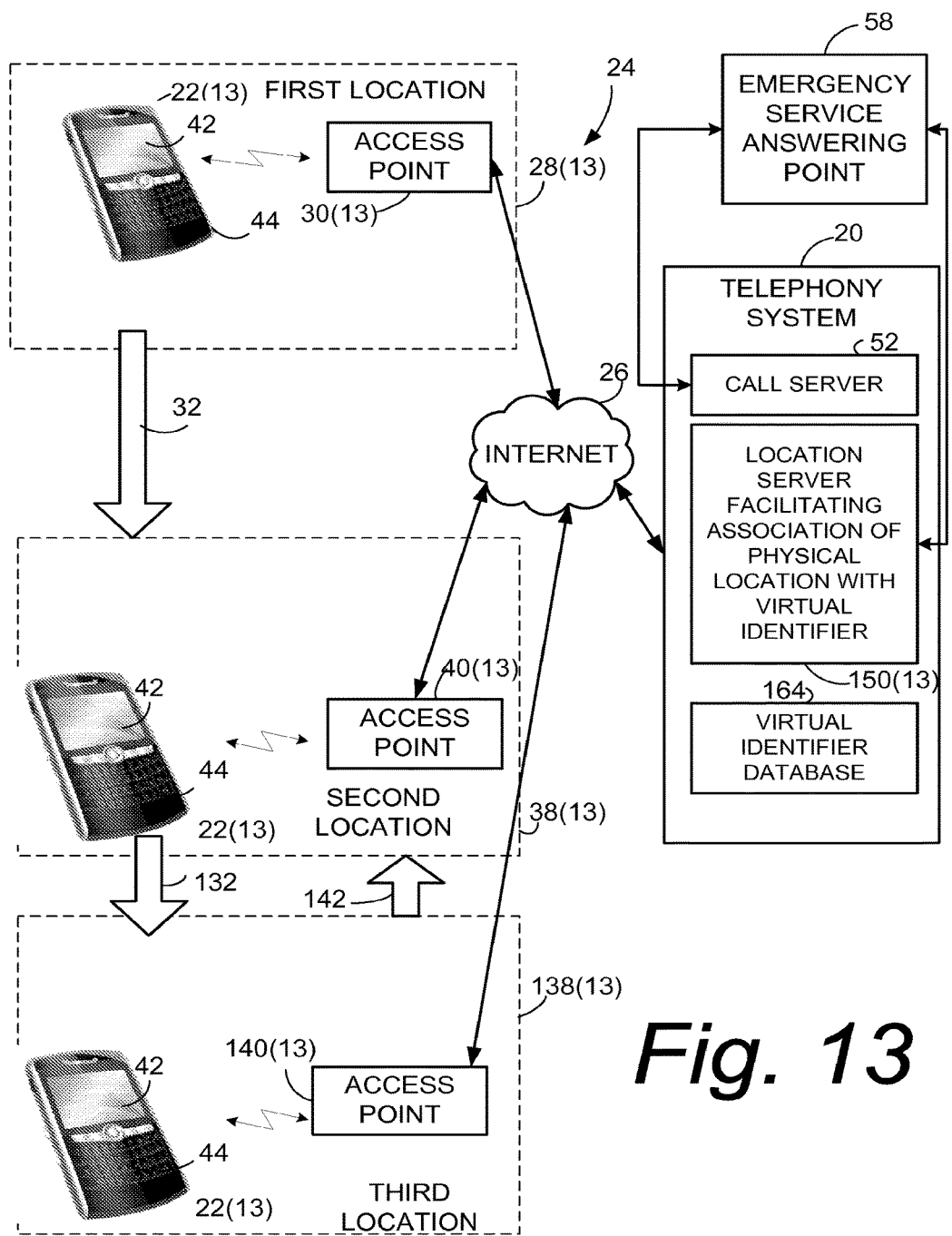
FIG. 13 is a diagrammatic view of an example radio communications system comprising a telephony system which implements a "virtual identifier" for emergency call placement.

FIG. 13 illustrates a "virtual identifier" embodiment and mode wherein telephony system 20 comprises a location server 150(13) which facilitates association of a street address location with a virtual identifier, e.g., a virtual identifier for the telephony device when the telephony device is used at a certain physical location. As described herein, a "virtual identifier" may be any string of characters (e.g., numbers) which is generated or selected for association with the certain physical location, and in some example implementations may be in the format of a virtual calling party number. Aspects of the FIG. 13 embodiment include obtaining and use of the virtual calling party number, as well as manner of transmission or communication of the physical location to and through the telephony system. The FIG. 13 embodiments and modes are also "location aware" in the sense that current location information (which may not be the most recently stored location information) may be reported to emergency service answering point 58.

For sake of discussion, it will be assumed that telephony device 22(13) is associated with a particular customer's account. The customer may have more than one telephony devices associated with the customer account. In FIG. 13 a telephony device 22(13) travels between plural locations, e.g., between plural physical locations, such as physical location 28(13), 38(13), and 138(13). A visit to each of the plural physical locations is referred to as a "telephony visit", and more particularly a telephony visit associated with the customer account.

When at first location 28(13), e.g., when in a telephony visit to first location 28(13), the telephony device 22(13) is in communication via access point 30(13) (comprising a radio base station and access point) with Internet 26. FIG. 13 further shows by displacement arrow 32 that telephony device 22(13) travels to second location 38(13) whereat the telephony device 22(13) in a telephony visit to second location 38(13) is connected to or served by another access point 40(13). As shown by arrow 132, telephony device 22(13) then travels to third location 138(13) whereat in a telephony visit to location 138(13) the telephony device 22(13) is connected to Internet 26 through access point 140(13). Thereafter, as shown by arrow 142, telephony device 22(13) returns back to second location 38(13), another telephony visit to second location 38(13).

For sake of illustration the telephony device 22(13) of FIG. 13 has been represented as a wireless telephony device. However, in variations of the implementation the telephony device 22(13) may take other forms of mobile devices, such as any of the telephony devices 22A-22E. Moreover, the customer's account may be associated with, e.g., have registered with the telephony communications system 20, one or more telephony devices such as any of the telephony devices 22A-22E. It will further be appreciated that in such variations the nature of the access point may change in accordance with the respective descriptions of FIG. 1A-FIG. 1E.

FIG. 13 further shows that whether at first location 28(13), second location 38(13), or third location 138(13) the telephony device 22(13) may be connected through Internet 26 to telephony system 20. Like telephony system 20 of FIG. 2, the telephony system 20 of FIG. 13 comprises a location server, call server 52, and subscription server 54. The location server 150(13) of telephony system 20 of FIG. 13 differs from the location server 50 of FIG. 2 in being described and functioning as a location server which facilitates association of physical location with virtual identifier.

Figure 14:
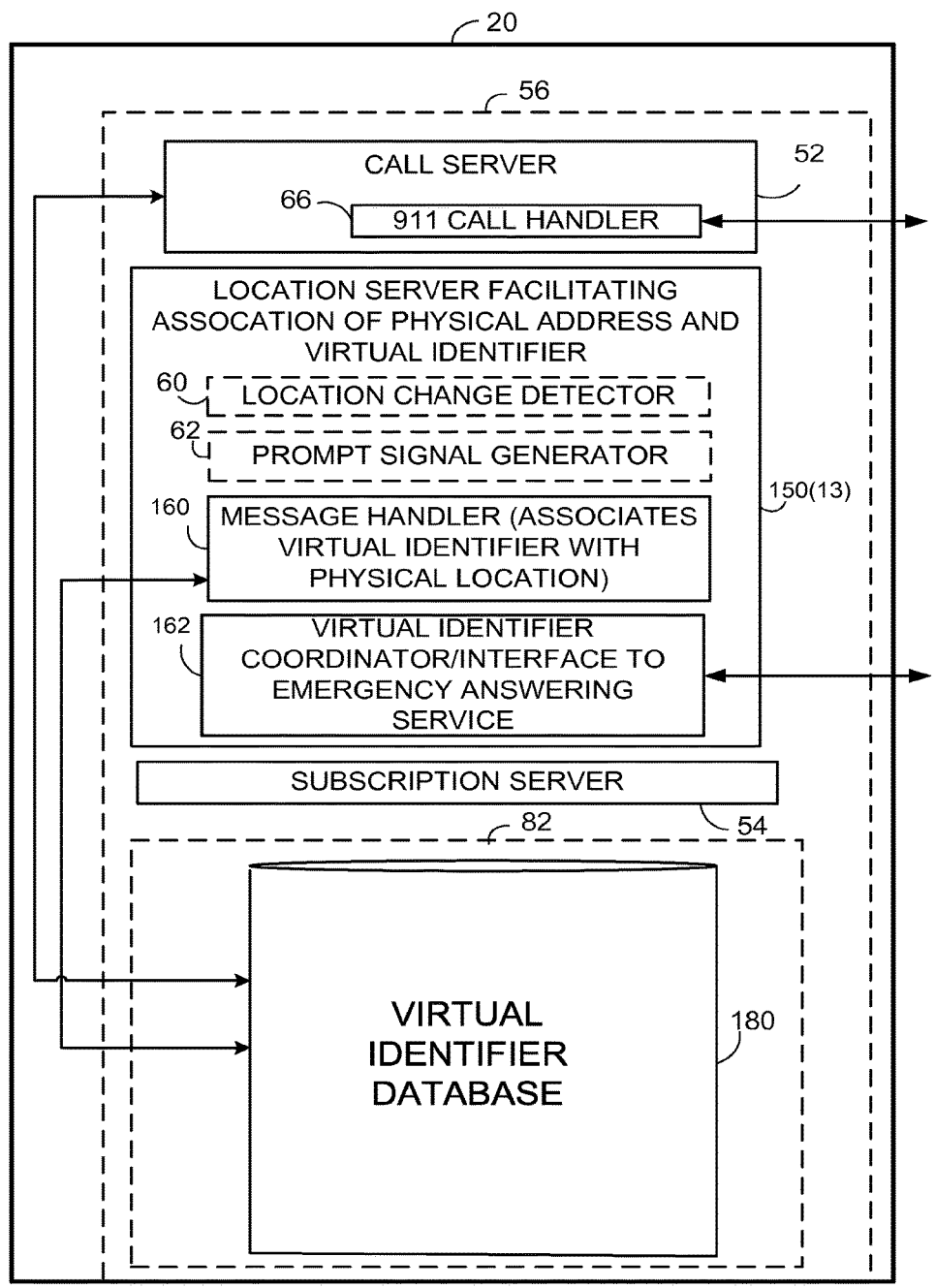
FIG. 14 is a schematic view of an example embodiment of the telephony system of FIG. 13.

As shown in more detail in FIG. 14, location server 150(13) of FIG. 13 may comprise message handler 160 and virtual identifier coordinator 162. As described herein, message handler 160 processes messages received during a telephony visit, e.g., from telephony device 22(13), and associates a virtual identifier with a physical location of the telephony visit, e.g., of the physical location visited by telephony device 22(13). The virtual identifier coordinator 162 also serves as an interface to emergency service answering point 58. As shown by broken lines, the location server 150(13) of FIG. 13 may also optionally comprise location change detector 60 and prompt signal generator 62 as understood with reference to other example embodiments and modes described herein. As explained herein, both location server 150(13) and call server 52 may comprise machine hardware 56 and as such may comprise one or more processors 120 as shown in FIG. 8.

Figure 15A:
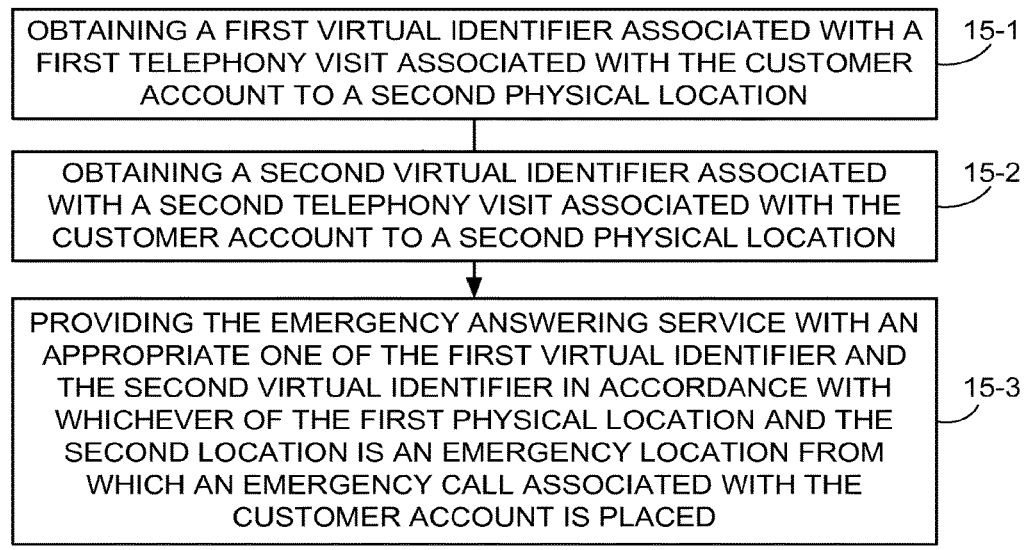
FIG. 15A and FIG. 15B are flowcharts showing basic exemplary acts or steps comprising example modes of methods of operating the telephony system of FIG. 13.

FIG. 15A illustrates example, representative, basic acts or steps which may be performed in a method of the example "virtual identifier" embodiment and mode of FIG. 13. Act 15-1 comprises obtaining a first virtual identifier associated with a first telephony visit associated with a customer account to a first physical location. For example, act 15-1 comprises obtaining the first virtual identifier for a first physical location visited by a telephony device subscribed in a customer account to the telephony communication system. For example, the first virtual identifier may become associated with the first physical location when the telephony device makes a call from the physical location. Act 15-1 thus performed upon "registering" with the telephony system 20 a physical location visited by a telephony device associated with the customer account, e.g., telephony device 22(13).

As used herein, the term "obtain" or "obtaining" includes that the telephony system 20 may assign the virtual identifier to be associated with a physical location. The location server 150(13) is configured to obtain/assign or otherwise associate the virtual identifier in coordination with an emergency service answering point 58 whereby the emergency service answering point 58 also associates the virtual identifier with the physical location. To this end, virtual identifier coordinator 162 signals or otherwise coordinates the virtual identifier and the physical location between location server 150(13) and emergency service answering point 58. In some instances herein it is mentioned that the virtual identifier may be associated with the physical location information, which essentially means information describing or identifying the respective physical location. Herein for sake of brevity "physical location" may be utilized instead of "physical location information"

It will be appreciated that act 15-1 may be and preferably is performed for plural physical locations for which there is a telephony visit associated with the customer account. In other words, for plural physical locations visited by a telephony device subscribed to the telephony communication system, a virtual identifier associated with the telephony device when making a call from the respective physical location is obtained. Act 15-2 thus comprises obtaining a second virtual identifier associated with a second telephony visit associated with the customer account to a second physical location. For example, act 15-2 comprises obtaining the second virtual identifier for a second physical location visited by a telephony device subscribed in the customer account to the telephony communication system.

Act 15-3 comprises providing the emergency answering service with an appropriate one of the first virtual identifier and the second virtual identifier in accordance with whichever of the first physical location and the second location is an emergency location from which an emergency call associated with the customer account is placed. That is, when an emergency call is placed by a telephony device associated with the customer account from an emergency physical location, the emergency service answering point 58 is provided with the virtual identifier assigned to the emergency physical location. The emergency service answering point 58 can then use the provided virtual identifier to ascertain from its own database the physical location information which corresponds to the provided virtual identifier.

Figure 15B:
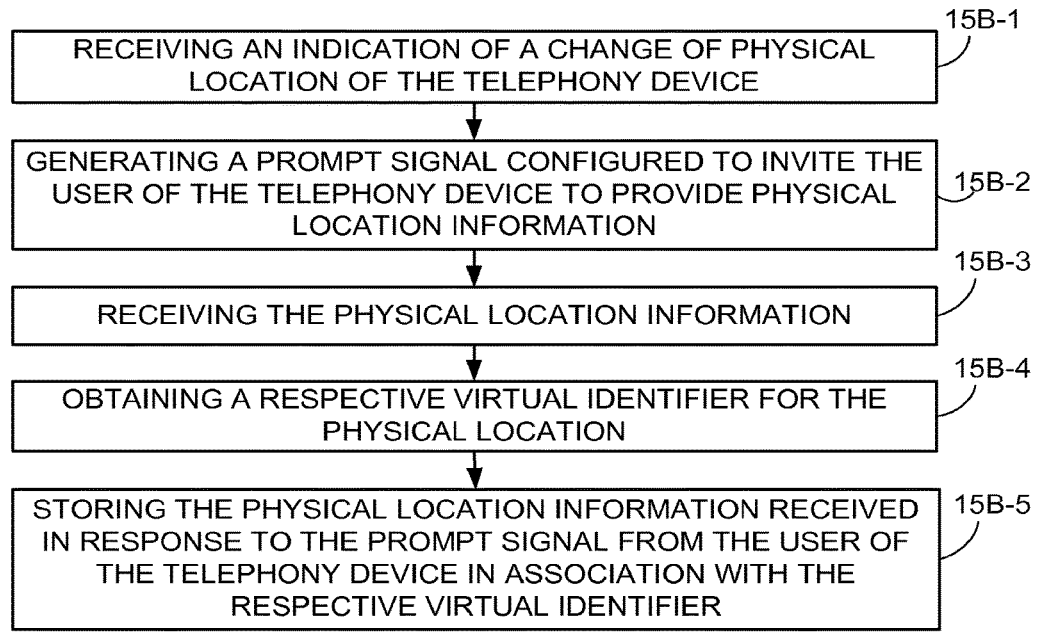

It should be appreciated that, in at least some example embodiments and modes, act 15-3 may be performed in a same call with either act 15-1 or act 15-2. In other words, in some example embodiments and modes the placement of an emergency call from a particular physical location may be the occasion at which the location server 150(13) obtains the respective virtual identifier associated with the telephony device at the physical location of the emergency. In other example embodiments and modes, such as that represented by the acts of FIG. 15B as later described, the placement of the emergency call may occur subsequent to acquisition of the virtual identifier for the physical location at which the emergency occurs, e.g., after a first call or perhaps even during a subsequent visit to the physical location at which the emergency occurs.

As mentioned above, in some example scenarios the first telephony visit and the second telephony visit may involve a same telephony device associated with the customer account. But in other example scenarios the first telephony visit and the second telephony visit may involve different telephony devices associated with the customer account.

Figure 16A:
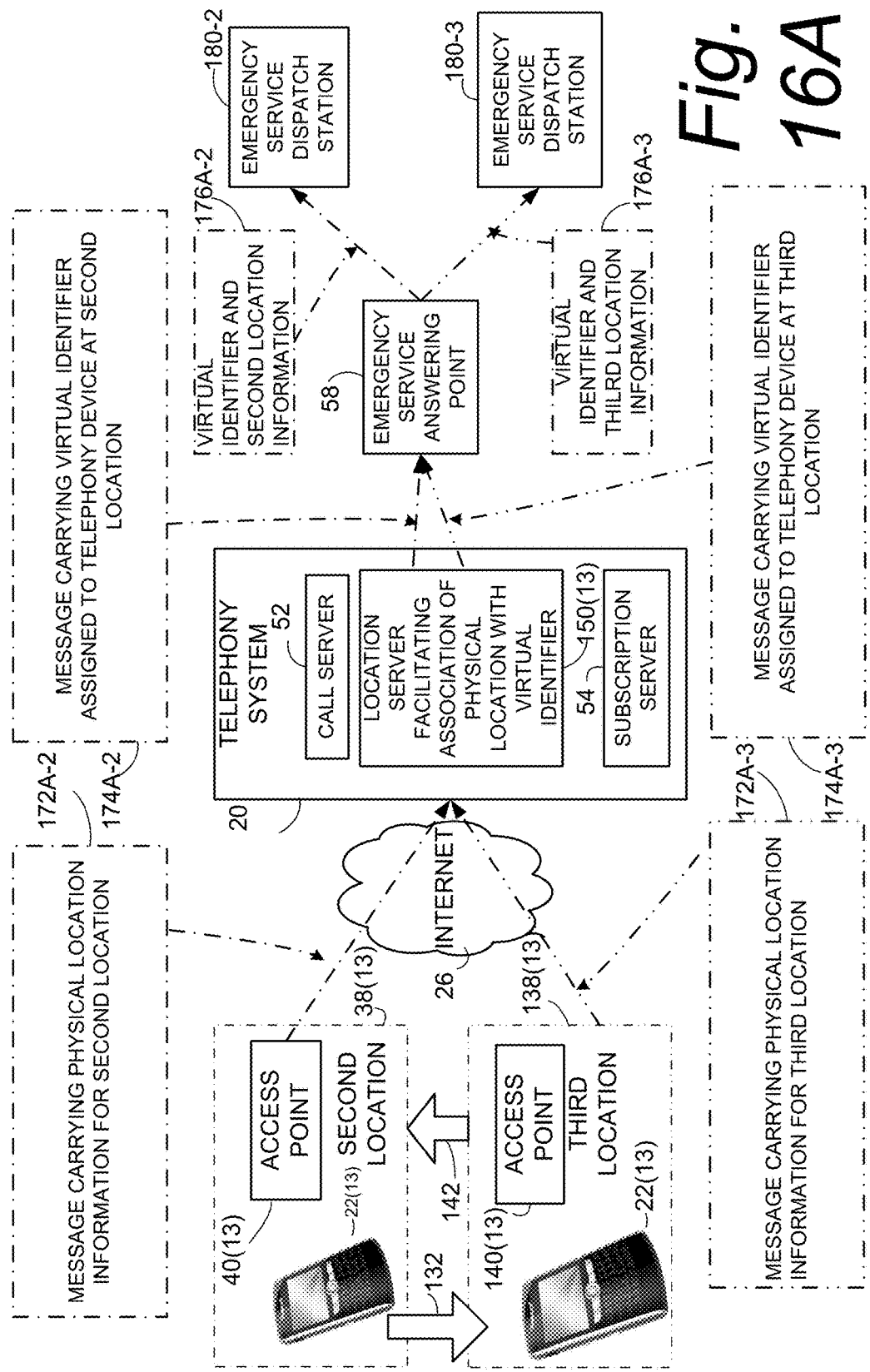
FIG. 16A and FIG. 16B are diagrammatic views illustrating example embodiments and modes of using messages to implement the "virtual identifier" of FIG. 13.

As shown in FIG. 16A, in one example embodiment and mode the location server 150(13) is configured to obtain the physical location information in a message received from a telephony visit (e.g., a first telephony visit when telephony device 22(13) accesses a data network (e.g., Internet 26) through which the telephony device 22(13) communicates with the telephony system 20 and a second telephony visit when telephony device 22(13), or any other telephony device associated with the customer account, accesses a data network (e.g., Internet 26) through which the telephony device 22(13) communicates with the telephony system 20. As indicated above, the access of the data network may or may not be in conjunction with an emergency call. That is, the access of the data network that results in registration of the physical location may occur at a time in advance of the emergency call (e.g., at a previous visit), or upon placement of the emergency call itself. When accessing the data network (Internet 26) at second location 38, location server 150(13) obtains the physical location information describing the physical location in a message 172A-2 received from the telephony device 22(13). In terms of message nomenclature, the suffix "A" indicates the FIG. 16A embodiment and mode and the suffix "-2" indicates the second physical location 38(13). It is further to be noted that the message blocks, as well as the physical location and lines representing messages or lead lines thereto for the second physical location, are depicted in single-dashed/single-dotted lines in both FIG. 16A and FIG. 16B.

On the other hand, when accessing the data network (Internet 26) at third location 138(13), location server 150 (13) obtains the physical location information in a message 172A-3 received from the telephony device 22(13). Again in terms of message nomenclature, the suffix "A" indicates the FIG. 16A embodiment and mode and the suffix "-3" indicates the second third location 138(13). The message blocks, as well as the physical location and lines representing messages or lead lines thereto for the third physical location, are depicted in single-dashed/double-dotted lines in both FIG. 16A and FIG. 16B.

In the example embodiment and mode of FIG. 16A, the location server 150(13) is also configured to generate a message to emergency service answering point 58 which bears the virtual identifier assigned to telephony device 22(13) at a physical location at which telephony device 22(13) makes an emergency call. For example, FIG. 16A shows an emergency message 174A-2 transmitted from location server 150(13) to emergency service answering point 58 which bears the virtual identifier assigned to telephony device 22(13) at second physical location 38(13). FIG. 16A further shows an emergency message 174A-3 which may be transmitted from location server 150(13) to emergency service answering point 58 if an emergency call were to be placed from the third physical location 38(13) using telephony device 22(13). The emergency message 174A-3 bears the virtual identifier assigned to telephony device 22(13) at third physical location 38(13).

In the example embodiment and mode of FIG. 16A, upon placement of an emergency call using telephony device 22(13) at second physical location 38(13), the emergency service answering point 58 receives the emergency message 174A from location server 150(13) which bears the virtual identifier assigned to telephony device 22(13). The emergency service answering point 58 then sends an emergency dispatch message 176A to an appropriate emergency service dispatch station 180. For example, FIG. 16A shows emergency service answering point 58 sending emergency dispatch message 176A-2 to emergency service dispatch station 180-2. The emergency dispatch message 176A-2 is generated by emergency service answering point 58 upon receipt of the emergency message 174A-2 which resulted from an emergency call placed from telephony device 22(13) at second physical location 38(13). FIG. 16A further shows that if an emergency call were placed from telephony device 22(13) at the third physical location 128(13), emergency service answering point 58 would send emergency dispatch message 176A-3 to emergency service dispatch station 180-3.

Figure 16B:
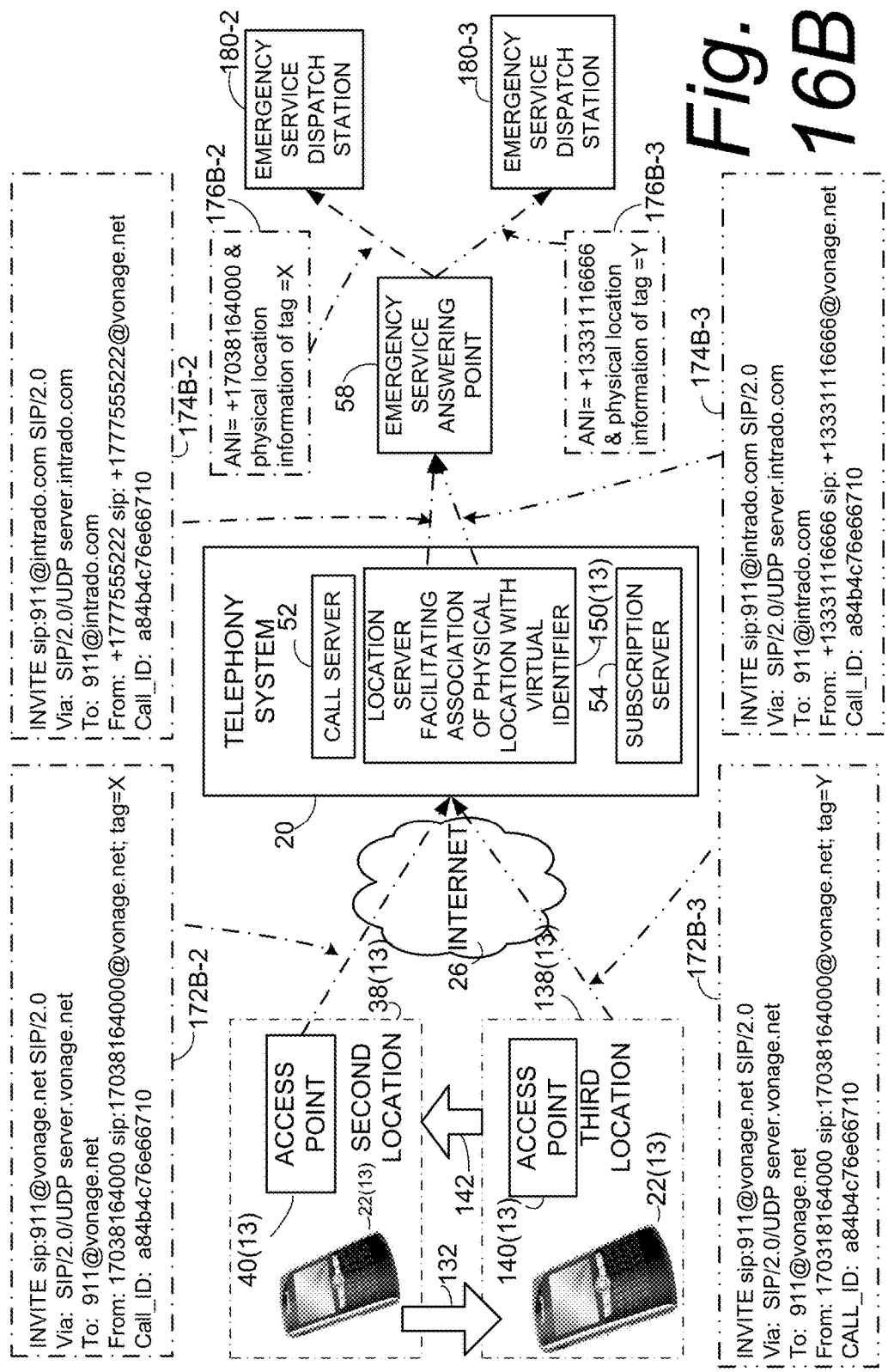

FIG. 16B shows a more detailed implementation of the embodiment and mode of FIG. 16A in which location server 150(13) is further configured to obtain the physical location information from a tag of a "From:" header of a Session Initiation Protocol (SIP) message received from the telephony device when the telephony device accesses a data network through which the telephony device communicates with the telephony system, e.g. upon occasion of a telephony visit. The messages of FIG. 16B which correspond to the messages of FIG. 16A have the same message numbers, but alphabetical suffixes that differ to reflect FIG. 16B rather than FIG. 16A. As with FIG. 16A, in FIG. 16B the "-2" suffixes and single-dashed/single-dotted lines refer to messages which result from activity at the second physical location 38(13); the "-3" suffixes and single-dashed/double-dotted lines refer to messages which result from activity at the third physical location 138(13).

Concerning first the message 172B-2, the telephony device 22(13) generates an SIP INVITE method type message having a called address of sip:911@vonage.net. For sake of simplicity the INVITE message 172B-2 is illustrated as including the four following header fields:
Via: SIP/2.0/UDP server.vonage.net
To: 911@vonage.net
From: 1703816400 sip:17038164000@vonage.net, tag=X
Call_ID: a84b4c76e66710

As is understood in the art, the "Via:" header of the INVITE message 172B-2 identifies the location where the telephony device 22(13) expects to receive responses and the transport method (e.g., UDP). As shown above, in FIG. 16B the telephony device 22(13) expects to receive responses at server.vonage.net, which in the FIG. 16B illustration is a server of telephony system 20. The "To:" header is a display name and the SIP URI being called. The "From:" header is a display name and URI of the requester, and includes a tag. In the example of FIG. 16B the display name is the calling party number, for which 17038164000 (i.e., 1-703-816-4000) is shown as an example. Typically in prior art practice the tag is a random string added by telephony device 22(13) to help identify the connection. But in the example embodiment and mode of FIG. 16B the tag of the "From:" header carries the physical location information for the telephony device 22(13). For sake of simplicity, the value of the tag of the "From:" header, which for message 172B02 carries the physical location information for physical location 38(13), is represented by the value "X". As explained herein, the value "X" may refer to any one or more of physical address locations, such as GPS physical location information (e.g., latitude and longitude); network topography (SSID, IP v4/v6 Addresses, Subnet Mask, Default Gateway, etc.); cell tower triangulation; femto/pico cell identifier(s); or even street address location. The "Call_ID:" header is globally unique for this call based on the caller's host name or IP and a cryptographically generated random number.

Figure 17A:
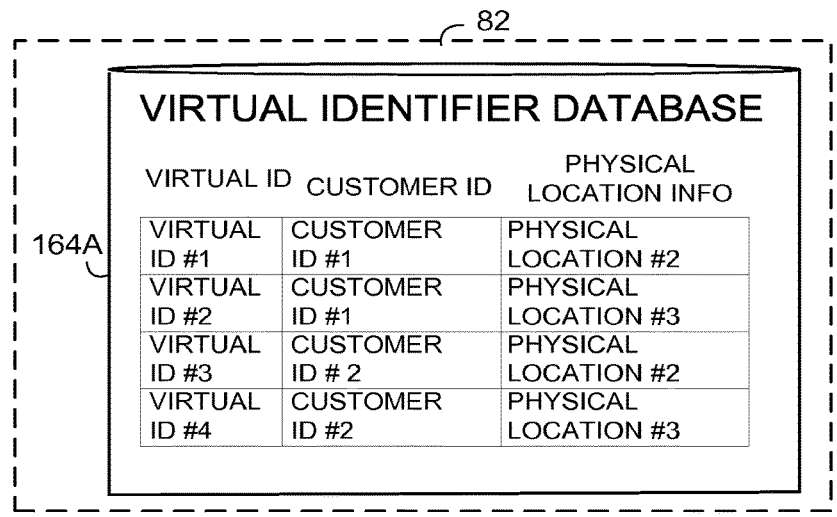
FIG. 17A and FIG. 17B are diagrammatic views depicting differing example modes and embodiments for configuring a virtual identifier database for use with the example embodiment of FIG. 13.
Figure 17B:
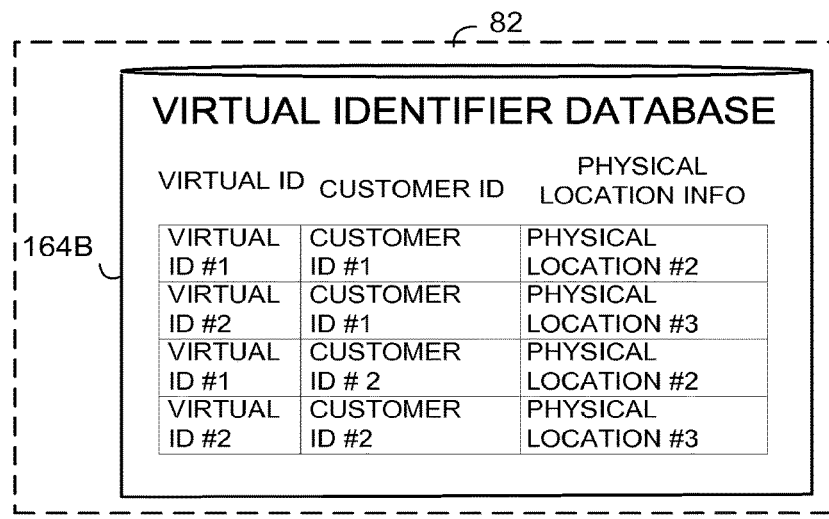

Upon reception of the message 172B-2, the message handler 160 obtains or assigns a virtual identifier to be associated with the second physical location 38(13). In the example of FIG. 16B, the virtual identifier just happens to take the form of a calling party number, e.g., 1-777-555-2222. This calling party number is not the normal or subscription-based number accorded to the account of the subscriber who owns telephony device 22(13), but is instead another calling party number that is specially assigned for emergency call purposes. There may be, for example, a pool of such eligible virtual calling party numbers from which the calling party number 1-777-555-2222 is obtained or assigned. The message handler 160 then stores in virtual identifier database 164 both the physical location information and the virtual identifier associated with the second physical location 38(13). Various example ways of configuring the virtual identifier database 164 and thus various ways of storing the virtual identifier are illustrated in FIG. 17A and FIG. 17B.

The obtaining/assigning of virtual identifier for a physical location is mutually agreed, negotiated, or coordinated between location server 150(13) and emergency service answering point 58. For example, the virtual identifier coordinator 162 may assign a virtual identifier to a physical location, and then send a signal or message to emergency service answering point 58 requesting acceptance or confirmation of the assignment. Or alternatively the location server 150(13) may inquire of emergency service answering point 58 if a virtual identifier is already or will be associated with a certain physical location at emergency service answering point 58, and obtain such associated virtual identifier from the emergency service answering point 58. If an initially assigned virtual identifier is not accepted, another/others may be proposed until there is mutual agreement. Upon reaching agreement the association of virtual identifier and physical location is also stored at emergency service answering point 58 for future use by telephony device 22(13) and possibly other telephony devices as well.

Should an emergency call be placed while telephony device 22(13) is at the second physical location 38(13), the emergency call will include the second physical location information. Upon receiving the emergency call the 911 call handler 66 consults the virtual identifier database 164 virtual identifier association log 170 and fetches the virtual identifier which is associated with the second physical location information. In this case the 911 call handler 66 obtains the virtual identifier which is the calling party number 1-777-555-2222.

In conjunction with placement of an emergency call, after obtaining from virtual identifier database 164 the virtual identifier paired with the physical location from which the emergency call was placed, the 911 call handler 66 generates the emergency message 174B-2. In the FIG. 16B embodiment and mode the emergency message 174B-2 is an SIP INVITE method type message having a called address of sip:911@intrado.com. For sake of simplicity the INVITE message 174B-2 is illustrated as including the four following header fields:
Via: SIP/2.0/UDP server.intrado.com
To: 911@intrado.com
From: +1777555222 sip: +1777555222@vonage.net
Call_ID: a84b4c76e66710

For the INVITE message 174B-2 of FIG. 16B, the "Via:" header indicates that the telephony device 22(13) expects to receive responses at server.intrado.com, which in the FIG. 16B illustration is a server of emergency service answering point 58. The "To:" header is a display name and the SIP URI being called. The "From:" header of the message 174B-2 comprises a display name and URI of the requester, which in this case includes the virtual identifier which corresponds to calling party number 1-777-555-2222.

Upon receipt of the INVITE message 174B-2 of FIG. 16B, the emergency service answering point 58 receives the virtual identifier (e.g., calling party number 1-777-555-2222) and obtains from its emergency service answering point database the corresponding physical location information. For the example under discussion, the emergency service answering point 58 receives the virtual identifier (e.g., calling party number 1-777-555-2222) and obtains from its emergency service answering point database the corresponding physical location information for the second location. Upon obtaining the corresponding physical location information, the emergency service answering point 58 generates emergency call 176B-2 to emergency service dispatch station 180-2. The emergency call 176B-2 includes the physical location information for the second physical location. Optionally the emergency call 176B-2 to emergency service dispatch station 180-2 may include the calling party number for the device that placed the emergency call (e.g., 1-703-816-4000), or some other information to identify the customer/subscriber of the telephony system 20 who placed the emergency call.

Actions and messages such as those described above with reference to the second physical location 38(13) may also occur at third physical location 138(13). For example, a call placed from third physical location 138(13), whether an emergency call or otherwise, may result in generation of message 172B-3 by telephony device 22(13). As shown in the FIG. 16B example embodiment and mode, the message 172B-3 may be a SIP INVITE method type message having a called address of sip:911@vonage.net. For sake of simplicity the INVITE message 172B-3 is illustrated as including the four following header fields:
Via: SIP/2.0/UDP server.vonage.net
To: 911@vonage.net
From: 17038164000 sip:17038164000@vonage.net, tag=Y
Call_ID: a84b4c76e66710

The tag field of the "From:" header of INVITE message 172B-3 appropriately differs from the tag field of the INVITE message 172B-2. Since the INVITE message 172B-3 is generated from the third physical location 138(13) while the INVITE message 172B-2 is generated from the second physical location 38(13), and since the value in the tag field is the physical location information, the tag field of INVITE message 172B-3 has a different value ("Y") than the tag field of INVITE message 172B-2 ("X").

As already explained herein, the tag field value "Y" may refer to any one or more of physical address locations, such as GPS physical location information (e.g., latitude and longitude); network topography (SSID, IP v4/v6 Addresses, Subnet Mask, Default Gateway, etc.); cell tower triangulation; femto/pico cell identifier(s); or even street address location.

Upon reception of the message 172B-3, the message handler 160 obtains or assigns a virtual identifier to be associated with the third physical location 138(13). In the non-limiting example of FIG. 16B, the virtual identifier takes the form of a calling party number, e.g., 1-333-111-6666. Again it is mentioned that this calling party number is not the normal or subscription-based number accorded to the account of the subscriber who owns telephony device 22(13), but is instead another calling party number of possibly plural calling party numbers that are specially reserved for assignment for emergency call purposes. The message handler 160 then stores in virtual identifier database 164 both the physical location information and a virtual identifier associated with the second physical location 138(13).

Should an emergency call be placed while telephony device 22(13) is at the third physical location 138(13), the emergency call will include the third physical location information ($3^{rd}$ LOC PLI). The 911 call handler 66 will then consult the virtual identifier database 164 and will fetch the virtual identifier which is associated with the third physical location information ($3^{rd}$ LOC PLI). In this case the 911 call handler 66 obtains the $3^{rd}$ LOC VIRTUAL IDENTIFIER, which happens to be the calling party number 1-333-111-6666.

In conjunction with placement of an emergency call, after obtaining the virtual identifier paired with the physical location from which the emergency call was placed, the 911 call handler 66 generates the emergency message 174B-3. In the FIG. 16B embodiment and mode the emergency message 174B-3 is an SIP INVITE method type message having a called address of sip:911@intrado.com. For sake of simplicity the INVITE message 174B-3 is illustrated as including the four following header fields:
Via: SIP/2.0/UDP server.intrado.com
To: 911@intrado.com
From: +13331116666 sip: +13331116666@vonage.net
Call_ID: a84b4c76e66710

For the INVITE message 174B-3 of FIG. 16B, the "Via:" header indicates that the telephony device 22(13) expects to receive responses at server.intrado.com, which in the FIG. 16B illustration is a server of emergency service answering point 58. The "To:" header is a display name and the SIP URI being called. The "From:" header of the message 174B-3 comprises a display name and URI of the requester, which in this case includes the virtual identifier which corresponds to calling party number 1-333-111-6666.

Upon receipt of the INVITE message 174B-3 of FIG. 16B, the emergency service answering point 58 receives the virtual identifier (e.g., calling party number 1-333-111-6666) and obtains from its emergency service answering point database the corresponding physical location information. Upon obtaining the corresponding physical location information the emergency service answering point 58 generates emergency call 176B-3 to emergency service dispatch station 180-3. The emergency call 176B-3 includes the physical location information for the third physical location and may optionally include the calling party number of the subscriber/customer associated with the telephony system 20 from which the emergency call was placed.

As shown by the example embodiment and mode of FIG. 16B, the virtual identifiers associated with the telephony device may comprise virtual calling party numbers which are coordinated with the emergency service answering point 58 to be associated with the physical location information for the respective physical locations. For example, in FIG. 16B the virtual identifier associated with the second physical location 38(13) is calling party number 1-777-555-2222 and the virtual identifier associated with the third physical location 38(13) is calling party number 1-333-111-6666. As mentioned above, virtual identifier types other than calling party numbers can also be utilized. In fact, any multi-string series of characters or digits may comprise the virtual identifier.

The virtual identifier database 164 of location server 150(13) may be configured, formatted, or operated in various manners, a few example of which are now provided by way of the example virtual identifier database 164A of FIG. 17A and the example virtual identifier database 164B of FIG. 17B. Both FIG. 17A and FIG. 17B show organization schemes for the respective virtual identifier databases 164A, 164B that reflect registration of plural physical locations by plural telephony devices. In particular, the virtual identifier databases of both FIG. 17A and FIG. 17B show physical locations registered by customer number 1 and customer number 2 (corresponding to first and second telephony devices. It just so happens that the two registrations shown for customer number 1 are for the second physical location 38(13) and for the third physical location 138(13) of FIG. 13. In other words, for the examples of both FIG. 17A and FIG. 17B the first customer using the first telephony device and the second customer using the second telephony device visit and register the same locations.

In the example scheme of organization of the virtual identifier database 164A shown in FIG. 17A, each registration of a physical location by any customer is associated with a unique virtual identifier. An example sequence of virtual identifier assignment of FIG. 17A begins with assignment of a unique first virtual identifier (virtual ID #1) when the first customer visits and registers the second physical location 38(13); and then is followed by assignment of a unique second virtual identifier (virtual ID #2) when the first customer visits and registers at the third physical location 138(13). Thereafter when the second customer visits and registers the second physical location 38(13) a unique third virtual identifier (virtual ID #3) is assigned, and when the second customer visits and registers the third physical location 38(13) a unique fourth virtual identifier (virtual ID #4) is assigned. In the organization scheme of FIG. 17A, each virtual identifier points or refers to or is associated with a unique combination or pairing of physical location and customer identifier. As understood from the foregoing, the physical location information for the particular location visited by a customer may be obtained from the registration message (e.g., from the tag field of a SIP header) and the customer identifier may also be obtained from the registration message (e.g., from the From header of the SIP message). Thus, with the organization scheme of virtual identifier database 164A according to FIG. 17A, upon receipt of an emergency call only the unique virtual identifier is needed in order to fetch both the physical location information and the customer identifier.

In the example scheme of organization of the virtual identifier database 164B shown in FIG. 17B, each physical location is associated with a virtual identifier, and the virtual identifier may be associated with a same physical location for plural customers. An example sequence of virtual identifier assignment of FIG. 17B begins with assignment of a first virtual identifier (virtual ID #1) when the first customer visits and registers the second physical location 38(13). The first virtual identifier (virtual ID #1) may thus be stored in virtual identifier database 164B in association with the first customer and the first physical location. For example, the first virtual identifier (virtual ID #1) may be stored in a field of a record associated with virtual ISD #1 (e.g., the first field of a record, the record being illustrated as a row in FIG. 17B) and the customer ID and physical location information may be stored in second and third fields of the same record. Then when the first customer visits and registers at the third physical location 138(13); the second virtual identifier (virtual ID #2) is assigned and stored in a record that includes the second virtual identifier (virtual ID #2) as well as the first customer identifier and the physical location information for the third physical location 138(13). Thereafter when the second customer visits and registers the second physical location 38(13) the same virtual identifier that was previously used for the second location, e.g., virtual ID #1, is assigned and a third record is created in virtual identifier database 164B. When the second customer visits and registers the third physical location 38(13) the same virtual identifier that was previously used for the second location, e.g., virtual ID #1, is assigned and a fourth record is created in virtual identifier database 164B. As understood from the foregoing, the physical location information for the particular location visited by a customer may be obtained from the registration message (e.g., from the tag field of a SIP header) and the customer identifier may also be obtained from the registration message (e.g., from the "From" header of the SIP message). Thus, with the organization scheme of virtual identifier database 164A according to FIG. 17B, upon receipt of an emergency call both the virtual identifier and customer identifier are used to fetch the physical location information.

As mentioned above, the obtaining/assigning of virtual identifier for a physical location is mutually agreed, negotiated, or coordinated between location server 150(13) and emergency service answering point 58. Either the virtual identifier coordinator 162 may assign a virtual identifier to a physical location, and then send a signal or message to emergency service answering point 58 requesting acceptance or confirmation of the assignment, or the location server 150(13) may inquire of emergency service answering point 58 if a virtual identifier is already or will be associated with a certain physical location at emergency service answering point 58, and obtain such associated virtual identifier from the emergency service answering point 58. As understood from the foregoing description of configuration and operation of virtual identifier database 164A of FIG. 17A and the virtual identifier database 164B of FIG. 17B, the information exchanged upon establishment of a unique virtual identifier includes the virtual identifier, the physical location information, and the customer identifier (which may be the calling party number). In both cases the database of emergency service answering point 58 is provided with information so that the virtual identifier, physical location information, and customer identifier can be associated together in the database of emergency service answering point 58. In this way the emergency service answering point 58, upon receiving an emergency call such as call 176B-2 or call 176B-3, has the requisite information to send to the emergency service dispatch station 180-2. Advantageously, for the FIG. 17A scenario in an emergency situation the location server 150(13) need only send the unique virtual identifier to emergency service answering point 58, since the unique virtual identifier of FIG. 17A is sufficient to identify both the physical location information and the customer identifier. In the FIG. 17B situation, the customer identifier as well as the virtual identifier may be sent be sent to emergency service answering point 58. The customer identifier may be sent to emergency service answering point 58 in a header of the SIP message (e.g. message 174-2 and message 174-3. For example, the customer identifier may be included as a tag appended to the "From" header, or in a separate all-purpose header such as "Call-Info".

In at least one example implementation of the embodiment and mode of FIG. 13, the physical location information may comprise a street address location. In such case, the street address location may be stored both at the location server 150(13) and at the emergency service answering point 58.

In some example embodiments and modes the emergency message itself may constitute the messages 172A-2 and 172A-3 of FIG. 16A, and the messages 172B-2 and 172B-3 of FIG. 16B, as above discussed. In such example embodiments and modes placement of the emergency call may be the first opportunity to associate a virtual identifier with the respective physical location. Such emergency messages will then result in essentially immediate further messages 174A-2 and 174A-3 of FIG. 16A, and further messages 174B-2 and 174B-3 of FIG. 16B.

By contrast, in other example embodiments and modes the emergency call may be placed after a virtual identifier has been assigned to a physical location through another, e.g., non-emergency access. When making a non-emergency access, acts such as those of FIG. 15B may be performed. The location server 150(13) may be configured to perform the acts of FIG. 15B.

Act 15B-1 comprises receiving an indication of a change of physical location of the telephony device. Act 15B-2 comprises, upon receipt of the indication of change of physical location of the telephony device, generating a prompt signal configured to invite the user of the telephony device to provide a physical location information for a current physical location of the telephony device. Act 15B-3 comprises obtaining the physical location information for the current physical location (e.g., from a response to the prompt signal of act 15B-2). The current physical location may be a street address, or other type of physical location information as indicated above. Act 15B-4 comprises obtaining a virtual identifier for the physical location described by the physical location information obtained at act 15B-3. As explained above, this virtual identifier may be obtained (including assigned by location server 150(13)) in coordination with emergency service answering point 58. Act 15B-5 comprises storing the physical location information in association with the respective virtual identifier. As previously explained, such storage may occur in virtual identifier database 164.

As understood from previously described embodiments and modes, the location server 150(13) may detect a change of physical location in various ways, such as (for example): detecting a change of network address utilized by the telephony device; detecting a change of network provider utilized by the telephony device; detecting a change of GPS coordinates of the telephony device; and/or detecting a change of wireless access connection of the telephony device.

As also understood from previously described embodiments and modes, the location server 150(13) may be configured to generate the prompt signal in accordance with a predetermined displacement of the telephony device, and such predetermined displacement maybe configured by user input. Alternatively or additionally, the location server 150(13) may be configured to generate the prompt signal if it determines that a predetermined stationary time period has elapsed since detection of the change of physical location of the telephony device. Such predetermined stationary time period may also be configured by user input.

As also understood from previously described embodiments and modes, the location server 150(13) may be configured to generate the prompt signal so as to provide the user with one or more candidate street address locations from which the user may select an updated street address location.

In example embodiments and modes described herein a virtual identifier may take the place of an actual caller ID that in prior art may be passed by telephony service 20 to emergency service answering point 58. Using the technology disclosed herein, each customer may have multiple virtual identifiers, each tied or otherwise associated with a specific physical location. Therefore the emergency service answering point 58 no long is bothered by updating a customer's 911 address, either statically or dynamically. Rather, the emergency service answering point 58, to the extent it is cognizant of the customer at all, subsumes the customer as a collection of virtual identifiers. The telephony communications system 20 brokers between such information as physical locations and physical street addresses, with the multiple virtual identifiers acting as proxies for physical location changes as input to the emergency service answering point 58.

Figure 18:
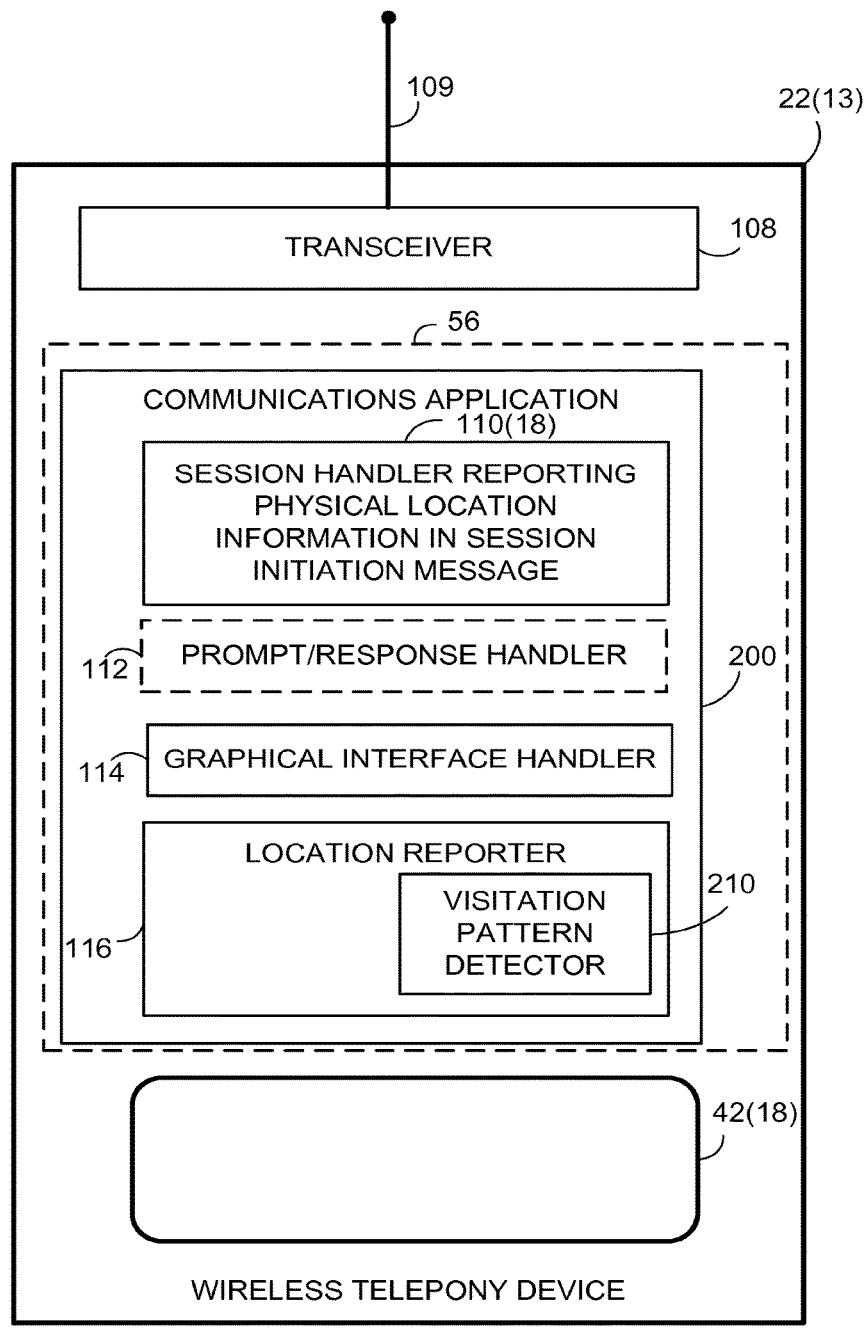
FIG. 18 is a schematic view of an example embodiment of a wireless telephony device which may implement the "virtual identifier" of FIG. 13.

In another of its aspects the technology described herein in conjunction with the example embodiment and mode of FIG. 13 also includes communication application 200 which may be executed at the telephony device 22(13). FIG. 18 illustrates execution of communication application 200 at telephony device 22(13) of FIG. 13. The communication application 200 is stored on non-transitory computer readable storage medium and is executed by machine hardware 56 (see FIG. 8), which may include one or more processors. The telephony device 22(13) comprises radio transceiver 108 (e.g., a radio communications interface) which (using one or more antenna 109) communicates with radio base station 78, and through access network 79 to Internet 26. The telephony device 22(13) comprises input and output interface 42(18) for interaction with a user.

The communication application 200 is illustrated as comprising the following functional units or entities: session handler 110(18); prompt/response handler 112; graphical interface handler 114; and location reporter 116. The session handler 110(17) essentially initiates messages to and handles messages received from telephony system 20.

The communication application 200 comprises instructions which are stored on a non-transitory storage medium. The communication application 200, when executed (e.g., by the processor of machine hardware 56), performs an act of including physical location information of a physical location at which the telephony device is located in a message configured to initiate a session with the Internet Protocol telephony system. As shown in FIG. 16B, execution of communication application 200 may include the physical location information in a tag field of a "From:" header of a Session Initiation Protocol (SIP) message. Of course, execution of communication application 200 may also result in transmission of the message, e.g., the SIP message, to telephony system 20.

The communication application 200 is also configured to acquire, e.g., from location reporter 116, the physical location information which is included in the session initiation message. As indicated earlier, such physical location information may comprise one or more of the following: GPS physical location information (e.g., latitude and longitude); network topography (SSID, IP v4/v6 Addresses, Subnet Mask, Default Gateway, etc.); cell tower triangulation; femto/pico cell identifier(s); or even street address location.

In other example modes the location reporter 116 may determine that the user should be prompted to enter or confirm physical location information when the location reporter 116 has detected or ascertained that the telephony device 22(13) has visited a candidate physical location according to a predetermined visitation pattern. To this end the location reporter 116 may comprise visitation pattern detector 210.

Figure 19:
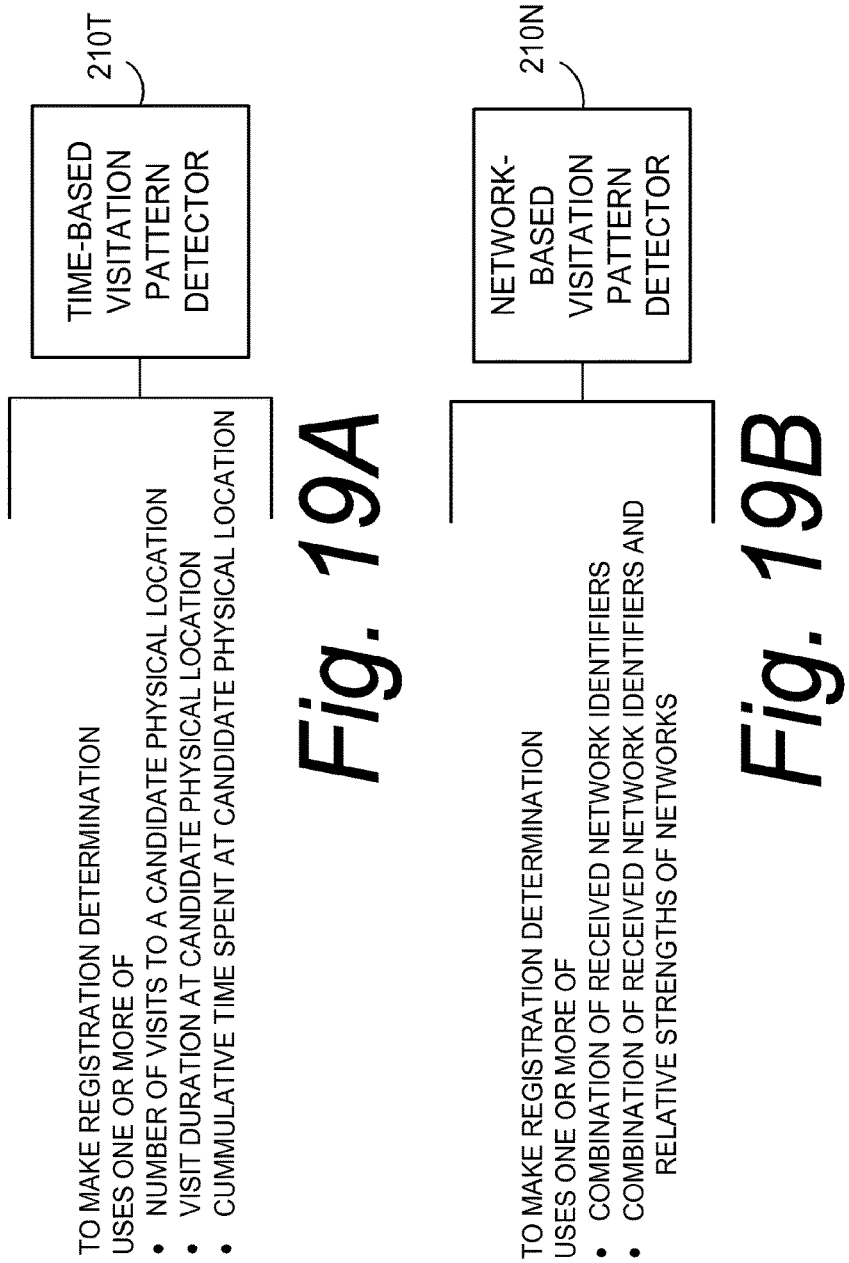
FIG. 19A and FIG. 19B are diagrammatic views showing example pattern criteria for a time-based visitation pattern detector and a network-based visitation pattern detector, respectively.

In a first example embodiment and mode visitation pattern detector 210 is a time-based visitation pattern detector 210T shown in FIG. 19A. The time-based visitation pattern detector 210T may be configured to use one or more of the following non-limiting list of criteria to make the determination:

The telephony device 22(13) has visited the same candidate physical location more than a predetermined number of times over a specified time window.

The telephony device 22(13) has visited the same candidate physical location more than a predetermined number of times over a specified time window and during those predetermined number of visits has spent cumulative time that exceeds prescribed accumulated visitation time.

On one or more visits in a specified time window the telephony device 22(13) has spent cumulative time that exceeds a prescribed accumulated visitation time.

The telephony device 22(13) has visited the same candidate physical location for more than a minimum visit duration for more than a predetermined number of times over a specified time window.

Thus, in one example implementation shown in FIG. 19A, a time based-visitation pattern detector 210 thus uses information of one or more of a number of visits to a candidate physical location within a specified time window, visit duration within the specified time window, and cumulative time spent at the candidate physical location within the specified time window to make a determination that the candidate physical location is to be registered with location server 150(13) as a physical location for emergency reporting purposes.

The specified time window could be any configured or changeable time interval, such as 24 hour day, 7 day week, month, for example. Upon making the determination that the candidate physical location should be considered for registration with location server 150(13) for emergency call purposes, the visitation pattern detector 210 may either request prompt/response handler 116 to prompt the user for the physical location information, e.g., street address, as understood from the foregoing.

In another example implementation shown in FIG. 19B, a network-based visitation pattern detector 210N uses a pattern of detected networks to determine physical location, and make thereafter may make a determination that the candidate physical location should be considered for registration with location server 150(13) for emergency call purposes. The network-based visitation pattern detector 210N may be configured to use, as non-limiting criteria to make the determination, the fact that on a predetermined number of occasions the telephony device 22(13) receives signals from a recognized pattern of networks. The recognized pattern may be, for example, a particular combination of networks for which network identifiers are received by telephony device 22(13). For example, when visiting a particular physical location the telephony device 22(13) receives signals, e.g., network identifiers, from a first network of merchant A, a second network of restaurant B, and a third network of office C.

Figure 21:
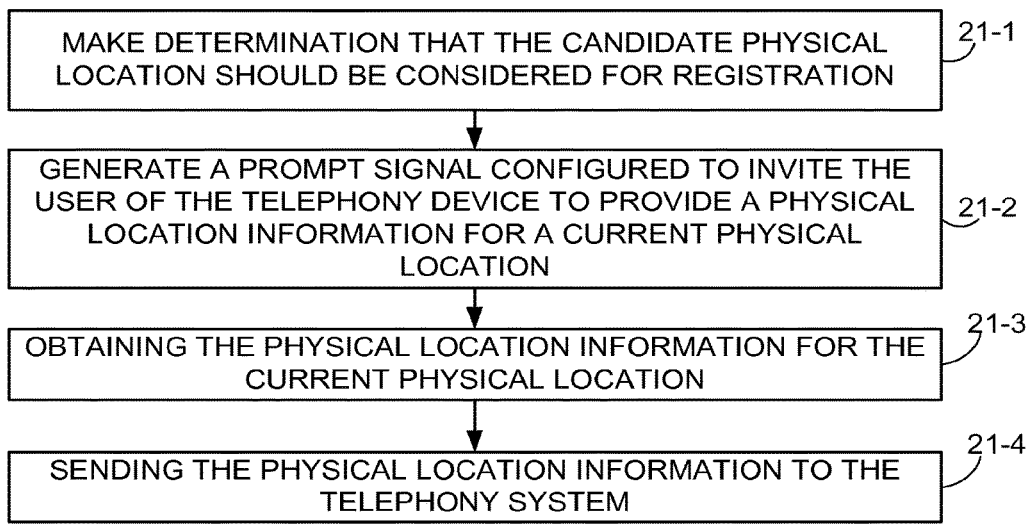
FIG. 21 is a flowchart showing example basic acts or steps performed by selected aspects of a communication application executed at a telephony device.

An example embodiment and mode showing example acts or steps performed by an example network-based visitation pattern detector 210N is illustrated in FIG. 21. Act 20-1 comprises telephony device 22(13) receiving network identifiers from a particular pattern of combination of networks. For example, the pattern may comprise the first network of merchant A, the second network of restaurant B, and the third network of office C. Act 20-2 comprises the telephony device 22(13) storing in association with a candidate physical location the received network identifiers of the particular combination (and, optionally, an indication of received signal strength for each network of the combination). Act 20-3 comprises the telephony device 22(13), at a subsequent time, detecting reception of a same pattern of network identifiers (and optionally same or similar proportions of relative signal strengths). In the example under discussion, the visitation pattern detector 210N realizes that it is receiving signals from the first network of merchant A, the second network of restaurant B, and the third network of office C, and that such matches the pattern or combination of networks already stored at act 20-2. Act 20-4, which is optional, comprises determining whether the detection of the pattern of networks has met other predetermined time criteria, such as detection for a sufficient number of times or sufficient duration for one or more visits. Any one or more of the timing criteria above discussed in conjunction with time-based visitation pattern detector 210T may be utilized for optional act 20-4. Either following act 20-3 or act 20-4, as act 20-5 the telephony device 22(13) confirms the determination that, based on the pattern of networks, the physical location should be registered, or at least considered for registration.

Figure 20:
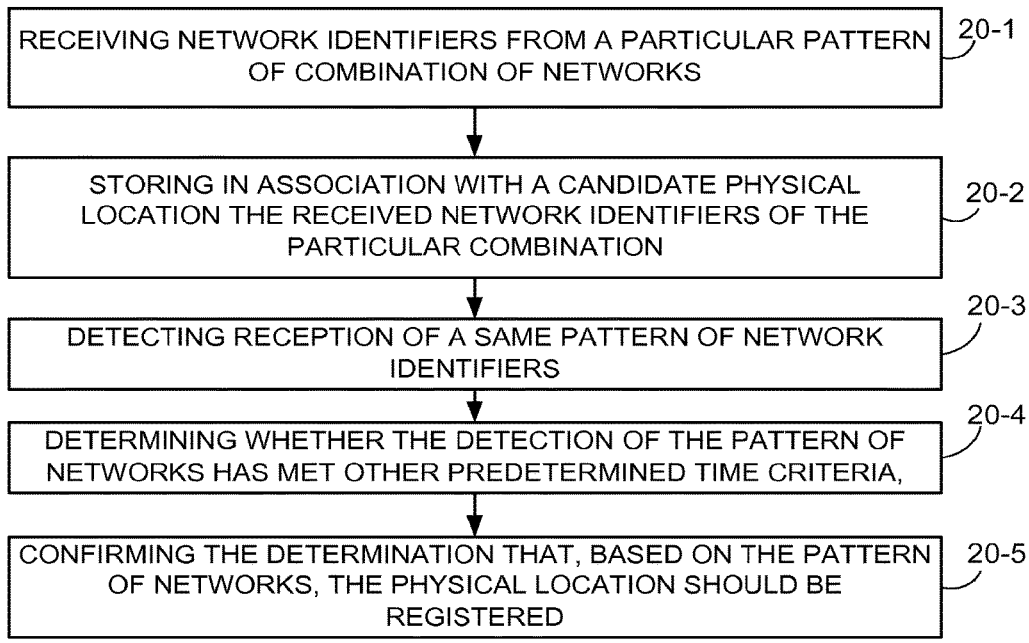
FIG. 20 is a flowchart showing example basic acts or steps performed by selected aspects of an example network-based visitation pattern detector of a communication application executed at a telephony device.

Whether a determination of visitation pattern detector 210 is made in accordance with the example embodiment and mode of FIG. 19A or FIG. 19B, the determination may comprise an act performed by communication application 200 as shown in FIG. 20. Act 21-1 comprises the determination just-described, e.g., the visitation pattern detector 210 (e.g., time-based visitation pattern detector 210T or network-based visitation pattern detector 210N) making a determination that the candidate physical location should be considered for registration with location server 150(13) for emergency call purposes. Act 21-2 (similar to act 15B-2 of FIG. 15B) comprises generating a prompt signal configured to invite the user of the telephony device to provide a physical location information for a current physical location of the telephony device. Such prompt signal may be generated by prompt/response handler 116. Act 21-3 comprises obtaining the physical location information for the current physical location. Act 21-4 comprises sending the physical location information to the telephony system 20, i.e., to the location server 150(13). Example techniques and messages for sending the physical location information to location server 150(13) are described in FIG. 16A and FIG. 16B.

It should further be understood that the telephony device 22(13) may on its own initiative, upon detecting the prescribed pattern, without prompting the user for entry of physical location information, register with location server 150(13) as the current physical location information whatever physical location information the telephony device 22(13) may already know, have obtain, or at that time obtain (e.g., from GPS) without user interaction.

In some example embodiments and modes the time-based visitation pattern detection and/or network-based visitation pattern detection may instead or additionally be performed by telephony system 20. In such case, the acts above described for the visitation pattern detector 210T and/or the visitation pattern detector 210N may instead or additionally be performed by location server 150(13). In such case the following further acts or steps (which are understood with reference to the earlier described example embodiment of FIG. 6B as well as acts of FIG. 15B) may be performed by or at the telephony system 20: (a) authorizing the telephony system to be informed of a change of physical location (based on visitation pattern detection) of a telephony device subscribed to the telephony communication system; (b) providing a prompt signal configured to invite the user of the telephony device to provide an updated street address location; (c) configuring a graphical interface for the user to enter the updated street address location. Upon entry of the updated physical location information (e.g., street address location, for example), the communication application 200 transmits the updated street address location received to the telephony system in the session initiation message, e.g., in the SIP message tag field as described above.

Functions described herein, including functions of the servers 52, 50, and 54, as well as functions of location server 150 and location server 150(13), the functions of stationary computer 102, and the functions of telephony device 22, may, at least in some embodiments and modes, be performed by machine hardware 56. FIG. 8 shows an example of such machine hardware 56 as comprising one or more processors 120, program instruction memory 122; other memory 124 (e.g., RAM, cache, etc.); input/output interfaces 126; peripheral interfaces 128; support circuits 129; and busses 130 for communication between the aforementioned units.

The memory 124, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 129 are coupled to the processors 120 for supporting the processor in a conventional manner. These circuits include cache, power supplies, clock circuits, input/output circuitry and subsystems, and the like.

Software routines such as software for location server 50 of telephony system 20 and the software (e.g., emergency street address registration application 100) for the telephony devices 22 are executed by processors 120 of the location server telephony system 20 and telephony device 22, respectively. For the machine hardware 56 of each of location server 50, location server 150, location server 150(13), and telephony device 22 such software may be stored on non-transitory memory such as program instruction memory 122. Also, the software routines could also be stored remotely from the CPU, e.g., remotely from processors 120. For example, the software could be resident on servers and memory devices that are located remotely from the CPU, but which are accessible to the CPU via a data network connection. Such software, when executed by processors 120, transforms the general purpose computer into a specific purpose computer that performs one or more functions of the IP telephony system 20. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 9:
FIG. 9 is a diagrammatic view illustrating an advantage of using a current street address location for emergency system access.

In many if not most cases the use of the current street address location provides more accurate location information than raw geographical physical location information such as IP address or GPS coordinates. For example, in a dense urban area some types of physical location information such as GPS or other coordinates, e.g., latitude/longitude information, may not provide enough specificity to quickly and accurately locate a distressed caller. In a situation shown in FIG. 9, for example, the user of the telephony device may have moved from a first floor apartment or unit 140 to a higher floor unit 142. The technology disclosed by at least some embodiments and modes described herein offers the user the opportunity to supply current street address location which may include apartment unit, office number, or the like, and thereby enable the emergency service personnel to accurately discriminate the current exactly discernable street address location of the caller.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An Internet Protocol (IP) telephony communication system comprising:
 a location server configured to obtain a first virtual identifier associated with a first telephony visit associated with a customer account to a first physical location and to obtain a second virtual identifier associated with a second telephony visit associated with the customer account to a second physical location, wherein the first virtual identifier and the second virtual identifier are specially assigned for an emergency call purpose and do not provide telephonic contact to a customer who placed the emergency call, the location server being configured to obtain the first virtual identifier and the second virtual identifier in coordination with an emergency answering service and prior to the placement of an emergency call by one of one or more telephony devices associated with the first and second telephony visits by one or both of:
  generating or selecting one or both of the first virtual identifier and the second virtual identifier and obtaining acceptance of the one or both of the first virtual identifier and the second virtual identifier from the emergency answering service; and
  obtaining one or both of the first virtual identifier and the second virtual identifier from the emergency answering service;
 a call server configured to provide the emergency answering service with an appropriate one of the first virtual identifier and the second virtual identifier in accordance with whichever of the first physical location and the second location is an emergency location from which an emergency call associated with the customer account is placed.

2. The telephony communication system of claim 1, wherein the first telephony visit and the second telephony visit involve a same telephony device associated with the customer account.

3. The telephony communication system of claim 1, wherein the first telephony visit and the second telephony visit involve different telephony devices associated with the customer account.

4. The telephony communication system of claim 1, wherein the location server is further configured to obtain the physical location in a message received from a telephony device associated with the customer account when the telephony device accesses a data network through which the telephony device communicates with the telephony system.

5. The telephony communication system of claim 4, wherein the location server is further configured to obtain the physical location information from a tag of a "From:"

header of a Session Initiation Protocol (SIP) message received when a telephony device associated with the customer account accesses a data network through which the telephony device communicates with the telephony system.

6. The telephony communication system of claim 1, wherein the virtual identifier comprises a virtual calling party number which is coordinated with the emergency answering service to be associated with the physical location.

7. The telephony communication system of claim 1, further comprising a virtual identifier database configured to store the virtual identifier in association with the physical location.

8. The telephony communication system of claim 7, wherein when a telephony device registers a physical location with the telephony system, the location server is configured to store a unique virtual identifier, the unique virtual identifier being unique to a combination of customer identifier and the physical location being registered.

9. The telephony communication system of claim 7, wherein when a telephony device associated with the customer number registers a physical location with the telephony system the location server is configured to store a virtual identifier that has already been associated with the physical location being registered, whereby the physical location for the physical location being registered is accessed by a combination of the virtual identifier and customer identifier.

10. The telephony communication system of claim 1, wherein the location server is further configured:
    (1) to receive an indication of a change of physical location of a telephony device associated with the customer account;
    (2) upon receipt of the indication of change of physical location of the telephony device, to generate a prompt signal configured to invite the user of the telephony device to provide physical location information for a current physical location of the telephony device;
    (3) to obtain the physical location information for the current physical location; and
    (4) to store the physical location information in association with the respective virtual identifier.

11. The telephony system of claim 10, wherein the location server is configured to detect one or more of the following:
    a change of network address utilized by the telephony device;
    a change of network provider utilized by the telephony device;
    a change of GPS coordinates of the telephony device;
    a change of indoor location information such as a Bluetooth beacon; and
    a change of wireless access connection of the telephony device.

12. A method of operating an Internet Protocol (IP) telephony communication system comprising:
    obtaining in coordination with an emergency answering service a first virtual identifier associated with a first telephony visit associated with a customer account to a first physical location and prior to the placement of an emergency call by a telephony device associated with the first telephony visit;
    obtaining in coordination with an emergency answering service a second virtual identifier associated with a second telephony visit associated with the customer account to a second physical location and prior to the placement of an emergency call by a telephony device associated with the second telephony visit;
    at least one of the first virtual identifier and the second virtual identifier being obtained by one or both of:
        generating or selecting one or both of the first virtual identifier and the second virtual identifier and obtaining acceptance of the one or both of the first virtual identifier and the second virtual identifier from the emergency answering service; and
        obtaining one or both of the first virtual identifier and the second virtual identifier from the emergency answering service;
    wherein the first virtual identifier and the second virtual identifier are specially assigned for an emergency call purpose and do not provide telephonic contact to a customer who placed the emergency call; and
    providing the emergency answering service with an appropriate one of the first virtual identifier and the second virtual identifier in accordance with whichever of the first physical location and the second location is an emergency location from which an emergency call associated with the customer account is placed.

13. The method of claim 12, wherein the first telephony visit and the second telephony visit involve a same telephony device associated with the customer account.

14. The method of claim 12, wherein the first telephony visit and the second telephony visit involve different telephony devices associated with the customer account.

15. The method of claim 12, further comprising obtaining the physical location in a message received from a telephony device associated with the customer account when the telephony device accesses a data network through which the telephony device communicates with the telephony system.

16. The method of claim 15, further comprising obtaining the physical location information from a tag of a "From:" header of a Session Initiation Protocol (SIP) message received when a telephony device associated with the customer account accesses a data network through which the telephony device communicates with the telephony system.

17. The method of claim 12, wherein the virtual identifier comprises a virtual calling party number which is coordinated with the emergency answering service to be associated with the physical location.

18. The method of claim 12, further comprising storing the virtual identifier in association with the physical location in a virtual identifier database.

19. The method of claim 18, further comprising:
    a telephony device registering a physical location with the telephony system; and
    storing a unique virtual identifier in a virtual identifier database, the unique virtual identifier being unique to a combination of customer identifier and the physical location being registered.

20. The method of claim 18, further comprising:
    a telephony device associated with the customer number registering a physical location with the telephony system;
    storing in a virtual identifier database a virtual identifier that has already been associated with the physical location being registered, whereby the physical location for the physical location being registered is accessed by a combination of the virtual identifier and customer identifier.

21. The method of claim 12, further comprising the location server:

(1) receiving an indication of a change of physical location of a telephony device associated with the customer account;
(2) upon receipt of the indication of change of physical location of the telephony device, generating a prompt signal configured to invite the user of the telephony device to provide physical location information for a current physical location of the telephony device;
(3) obtaining the physical location information for the current physical location; and
(4) storing the physical location information in association with the respective virtual identifier.

22. The method of claim 21, further comprising detecting one or more of the following:
a change of network address utilized by the telephony device;
a change of network provider utilized by the telephony device;
a change of GPS coordinates of the telephony device;
a change of indoor location information such as a Bluetooth beacon; and
a change of wireless access connection of the telephony device.

23. The telephony communication system of claim 1, wherein the call server is configured to provide the emergency answering service with the appropriate one of the first virtual identifier and the second virtual identifier in a tag of a "From:" header of a Session Initiation Protocol (SIP) message generated for the emergency call.

24. The method of claim 12, further comprising providing the emergency answering service with the appropriate one of the first virtual identifier and the second virtual identifier in a tag of a "From:" header of a Session Initiation Protocol (SIP) message generated for the emergency call.

* * * * *